US012561089B2

(12) United States Patent
Moon et al.

(10) Patent No.: US 12,561,089 B2
(45) Date of Patent: Feb. 24, 2026

(54) STORAGE DEVICE WITH VARIABLE PROCESSING RATE AND OPERATION METHOD THEREOF

(71) Applicant: SAMSUNG ELECTRONICS CO., LTD., Suwon-si (KR)

(72) Inventors: Young-suk Moon, Suwon-si (KR); Bokyoung Kim, Suwon-si (KR); Hee Hyun Nam, Suwon-si (KR); Jinwoo Song, Suwon-si (KR); Hyewon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/743,963

(22) Filed: Jun. 14, 2024

(65) Prior Publication Data

US 2025/0147690 A1     May 8, 2025

(30) Foreign Application Priority Data

Nov. 6, 2023     (KR) ......................... 10-2023-0151534

(51) Int. Cl.
G06F 3/06 (2006.01)
(52) U.S. Cl.
CPC .......... G06F 3/0656 (2013.01); G06F 3/0604 (2013.01); G06F 3/0634 (2013.01); G06F 3/0679 (2013.01)
(58) Field of Classification Search
CPC .... G06F 3/0656; G06F 3/0679; G06F 3/0604; G06F 3/0634
See application file for complete search history.

(56) References Cited

U.S. PATENT DOCUMENTS

| | | | | |
|---|---|---|---|---|
| 8,024,517 B2 * | 9/2011 | LaFrese | .............. | G06F 12/0804 711/112 |
| 8,725,931 B1 * | 5/2014 | Kang | .................. | G06F 12/0246 710/52 |
| 8,930,630 B2 | 1/2015 | Park | | |
| 9,430,031 B2 | 8/2016 | Maroney et al. | | |
| 9,672,180 B1 | 6/2017 | Morshed et al. | | |
| 10,210,084 B1 | 2/2019 | Bruce et al. | | |
| 10,248,327 B2 * | 4/2019 | Kryvaltsevich | ....... | G06F 3/0659 |
| 10,509,743 B2 | 12/2019 | Croxford et al. | | |
| 10,877,699 B1 * | 12/2020 | Kotwal | .................. | G06F 3/0673 |
| 11,550,716 B2 | 1/2023 | Garg et al. | | |
| 2007/0250660 A1 * | 10/2007 | Gill | ..................... | G06F 12/0804 711/E12.009 |

(Continued)

FOREIGN PATENT DOCUMENTS

KR          10-1056460 B1     8/2011

*Primary Examiner* — Mark A Giardino, Jr.
(74) *Attorney, Agent, or Firm* — Sughrue Mion, PLLC

(57) ABSTRACT

An operating method of a storage device includes fetching, from an external host device, write command and write data, based on a 0-th fetch rate, storing the write data in a write cache region of a buffer memory device of the storage device, performing write cache processing with respect to the write cache region, based on a 0-th cache processing rate, the performing write cache processing including storing, in a nonvolatile memory device of the storage device, the write data of the write cache region, detecting a write cache level of the write cache region, and controlling the 0-th cache processing rate, based on the write cache level.

19 Claims, 18 Drawing Sheets

(56) References Cited

U.S. PATENT DOCUMENTS

| 2011/0191534 A1* | 8/2011 | Ash | .................... | G06F 12/0868 |
| | | | | 711/E12.019 |
| 2012/0278530 A1* | 11/2012 | Ebsen | ................ | G06F 13/1684 |
| | | | | 711/E12.008 |
| 2017/0249191 A1* | 8/2017 | Chang | ................... | G06F 9/4881 |
| 2022/0269435 A1* | 8/2022 | Yoon | .................... | G06F 3/0659 |

* cited by examiner

| | Service to internal operation | Service to Write Operation | |
|---|---|---|---|
| [Normal Mode] [1st Urgent Mode] | Internal Token [A] | Write Token [B] | Urgent Token [C] |
| [2nd Urgent Mode] | Internal Token [A] | Write Token [B] / Urgent Token [C] | |
| [Refill Mode] | Internal Token [A] | Write Token [B] | Urgent Token [C] Refill |

Figure 15:
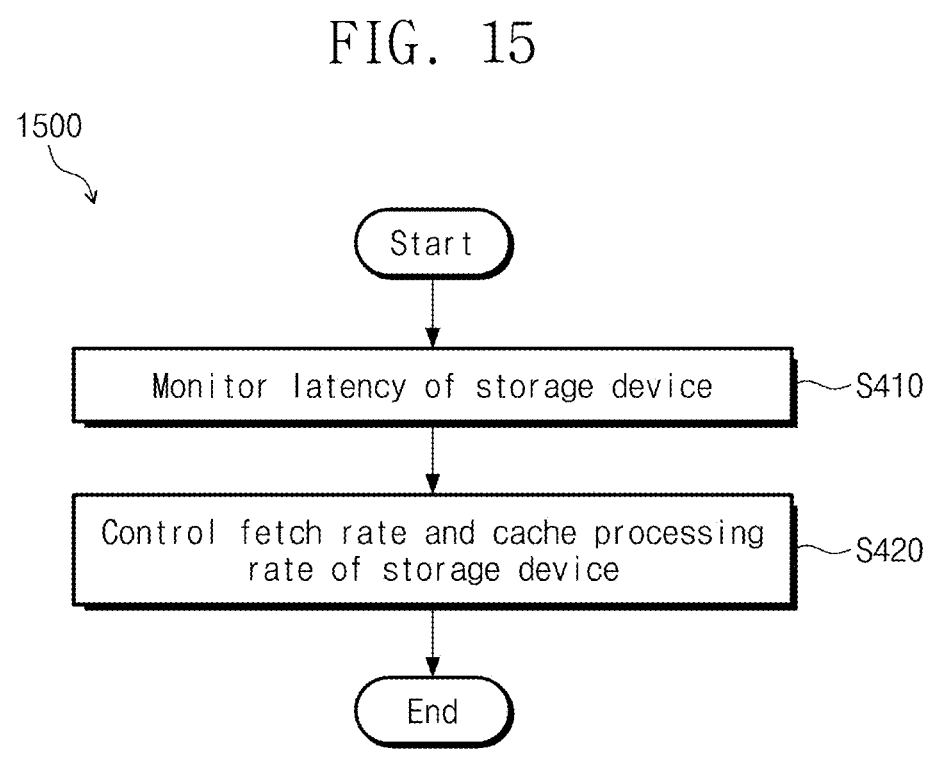

```
            ┌─────────┐
            │  Start  │
            └─────────┘
                 │
                 ▼
  ┌──────────────────────────────────┐
  │  Monitor latency of storage device │─── S410
  └──────────────────────────────────┘
                 │
                 ▼
  ┌──────────────────────────────────┐
  │ Control fetch rate and cache processing │─── S420
  │      rate of storage device        │
  └──────────────────────────────────┘
                 │
                 ▼
            ┌─────────┐
            │   End   │
            └─────────┘
```

1

STORAGE DEVICE WITH VARIABLE PROCESSING RATE AND OPERATION METHOD THEREOF

CROSS-REFERENCE TO RELATED APPLICATIONS

This application claims benefit of priority under 35 U.S.C. § 119 to Korean Patent Application No. 10-2023-0151534, filed on Nov. 6, 2023, in the Korean Intellectual Property Office, the disclosure of which is incorporated by reference herein in its entirety.

BACKGROUND

1. Field

The present disclosure relates generally to semiconductor memory, and more particularly, to a storage device and an operation method thereof.

2. Description of Related Art

A semiconductor memory may be classified as a volatile memory and/or a non-volatile memory. A volatile memory may refer to a memory that may lose data stored therein when a power is turned off, such as, but not limited to, a static random access memory (SRAM), a dynamic random access memory (DRAM), or the like. A nonvolatile memory may refer to a memory that may retain data stored therein even when a power is turned off, such as, but not limited to, a flash memory, a phase-change RAM (PRAM), a magnetic RAM (MRAM), a resistive RAM (RRAM), a ferroelectric RAM (FRAM), or the like.

A flash memory-based storage device (e.g., a solid state drive (SSD)) may be used as a high-capacity storage medium of a computing system. In such examples, various techniques may be used to potentially improve the performance of the flash memory-based storage device. For example, the storage device may store write data received from a host in a separate buffer memory (e.g., a write cache) and may notify the host that the write data has been stored. Subsequently, the storage device may program (store) the write data stored in the write cache in a flash memory of the storage device. That is, the storage device may potentially improve performance by using various additional resources (e.g., a buffer memory and a write cache).

SUMMARY

One or more example embodiments of the present disclosure provide a storage device with potentially improved performance, when compared to related storage devices, and an operation method thereof.

According to an aspect of the present disclosure, an operating method of a storage device includes fetching, from an external host device, write command and write data, based on a 0-th fetch rate, storing the write data in a write cache region of a buffer memory device of the storage device, performing write cache processing with respect to the write cache region, based on a 0-th cache processing rate, the performing write cache processing including storing, in a nonvolatile memory device of the storage device, the write data of the write cache region, detecting a write cache level of the write cache region, and controlling the 0-th cache processing rate, based on the write cache level.

According to an aspect of the present disclosure, a storage device includes a nonvolatile memory device, a buffer memory device including a write cache region and an internal traffic region, a storage controller configured to control the nonvolatile memory device and the buffer memory device, and a memory interface circuit configured to communicate with the nonvolatile memory device. The storage controller is further configured to fetch, from an external host device using a host interface circuit, a write command and write data, perform a maintenance operation on the nonvolatile memory device, detect a write cache level of the write cache region, perform, through the memory interface circuit, write cache processing for the write cache region, perform, through the memory interface circuit, internal traffic processing for the internal traffic region, and control a cache processing rate of the write cache processing, based on the write cache level. The write cache region is configured to store the write data. The internal traffic region is configured to store data to be used by the maintenance operation.

According to an aspect of the present disclosure, an operating method of a storage device includes detecting a write cache level of a buffer memory device of the storage device, and controlling a nonvolatile memory device of the storage device in at least one of a normal mode, a first urgent mode, or a second urgent mode, based on the write cache level. At least one of a cache processing rate or a fetch rate is differently determined in the normal mode, the first urgent mode, and the second urgent mode. The cache processing rate indicates a rate at which write data stored in the buffer memory device is flushed to the nonvolatile memory device. The fetch rate indicates a rate at which a write command and write data are fetched from an external host device.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIGS. 3A and 3B are diagrams for describing a write operation of a storage device, according to an embodiment;

FIG. 5 is a diagram for describing an operation of a storage device according to the flowchart of FIG. 4, according to an embodiment;

FIG. 12 is a diagram for describing operations of a performance manager and a token manager of FIG. 11, according to an embodiment;

FIG. 15 is a flowchart illustrating an operation of a storage device of FIG. 1, according to an embodiment;

DETAILED DESCRIPTION

Figure 1:
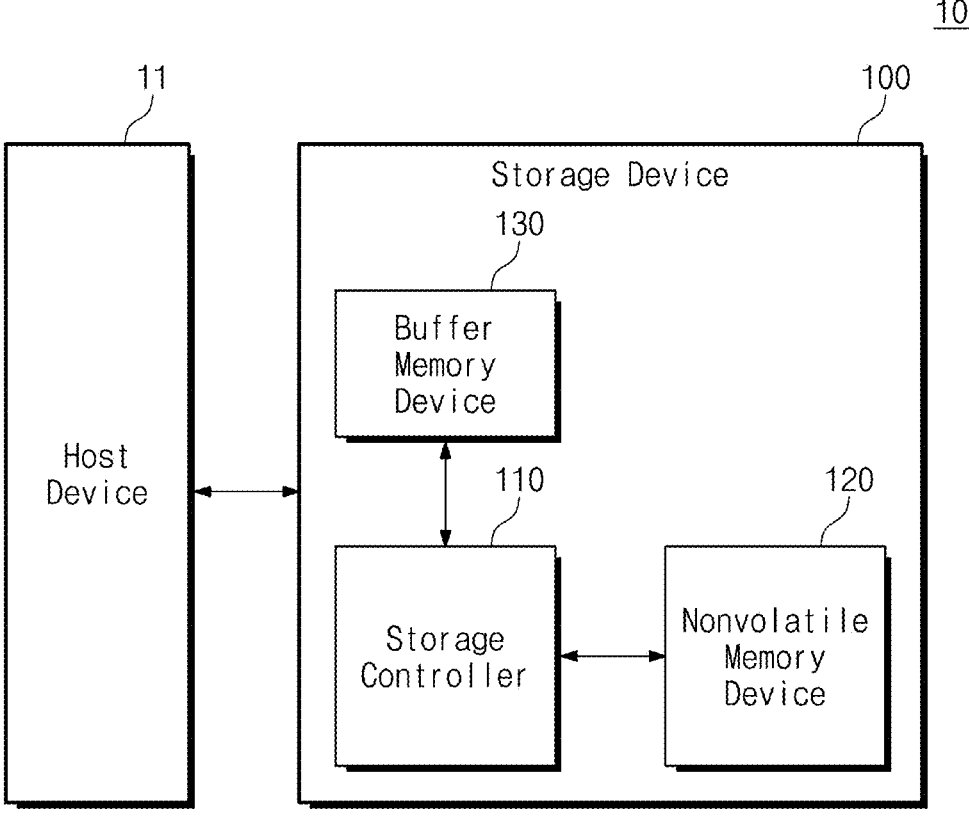
FIG. 1 is a block diagram illustrating a storage system, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Hereinafter, various embodiments of the present disclosure are described with reference to the accompanying drawings.

FIG. 1 is a block diagram illustrating a storage system, according to an embodiment. Referring to FIG. 1, a storage system 10 may include a host device 11 and a storage device 100. In an embodiment, the storage system 10 may be and/or may include a computing system or an information processing system, such as, but not limited to, a computer, a notebook, a server, a workstation, a portable communication terminal, a personal digital assistant (PDA), a portable multimedia player (PMP), a smartphone, a wearable device, or the like, and/or may be included therein.

The host device 11 may store data in the storage device 100 or may read data stored in the storage device 100. For example, the host device 11 may control the storage device 100 through a given interface. In an embodiment, the given interface may be non-volatile memory express (NVMe) interface. However, the present disclosure is not limited thereto. For example, the given interface may include at least one of various interfaces such as, but not limited to, an advanced technology attachment (ATA) interface, a serial ATA (SATA) interface, an external SATA (e-SATA) interface, a small computer small interface (SCSI) interface, a serial attached SCSI (SAS) interface, a peripheral component interconnection (PCI) interface, a PCI express (PCIe) interface, an Institute of Electrical and Electronics Engineers (IEEE) 1394 (FireWire) interface, a universal serial bus (USB) interface, a secure digital (SD) card interface, a multi-media card (MMC) interface, an embedded MMC (eMMC) interface, a universal flash storage (UFS) interface, an embedded UFS (eUFS) interface, a compact flash (CF) card interface, and a Compute eXpress Link (CXL) interface.

Under control of the host device 11, the storage device 100 may store data and/or may output the stored data. The storage device 100 may include a storage controller 110, a nonvolatile memory (NVM) device 120, and a buffer memory device 130.

The storage controller 110 may control an overall operation of the storage device 100. For example, under control of the host device 11, the storage controller 110 may store data in the NVM device 120 and/or may read data stored in the NVM device 120. For the efficient operation of the storage device 100, the storage controller 110 may perform various maintenance operations (e.g., wear leveling, garbage collection, and bad block management) on the NVM device 120.

Under control of the storage controller 110, the NVM device 120 may store data and/or may output the stored data. In an embodiment, the NVM device 120 may be and/or may include a NAND flash memory. However, the present disclosure is not limited thereto, and the NVM device 120 may be and/or may include other types of non-volatile memories.

The buffer memory device 130 may store a variety of information and/or data that may be necessary for the storage device 100 to operate. For example, the buffer memory device 130 may store meta information (e.g., map data and/or journal data) that may be used by the storage controller 110.

In an embodiment, the buffer memory device 130 may be used as a cache memory. For example, the buffer memory device 130 may be and/or may include a dynamic random access memory (DRAM). As another example, the operating speed of the buffer memory device 130 may be faster than the operating speed of the NVM device 120. However, the present disclosure is not limited thereto. For example, the buffer memory device 130 may be and/or may include various memories (e.g., a static random access memory (SRAM), a magnetoresistive random access memory (MRAM), a thyristor-based random access memory (TRAM), or the like) with a relatively fast operating speed, when compared to an operating speed of the NVM device 120. In a write operation of the storage device 100, the storage controller 110 may first store the write data received from the host device 11 in the buffer memory device 130 and may transmit a completion and/or a response to the write operation to the host device 11. Accordingly, the latency of the write operation of the storage device 100 may be reduced.

In an embodiment, the capacity of the buffer memory device 130 may be limited. That is, when the storage device 100 performs a continuous write operation, a sequential write operation, and/or a write operation on a large amount of write data, the available capacity of the buffer memory device 130 may be insufficient. In such an embodiment, the latency of the write operation of the storage device 100 may increase, and consequently, the performance of the storage device 100 may be reduced.

According to an embodiment, the storage controller 110 may control a cache processing rate and/or a command fetch rate based on a write cache level LV_C of the buffer memory device 130. For example, the write cache level LV_C may indicate a capacity that may be used as a write cache in the buffer memory device 130. That is, the write cache level LV_C being relatively high may indicate that a capacity used for the write cache in the buffer memory device 130 may be high (and/or that a capacity available for the write cache may be relatively small), and the write cache level LV_C being relatively low may indicate that a capacity used for the write cache in the buffer memory device 130 may be relatively small (and/or a that capacity available for the write cache may be relatively large).

When the write cache level LV_C is full (e.g., the write cache of the buffer memory device 130 may not be able to store any additional write data), the latency of the write operation of the storage device 100 may sharply increase. According to an embodiment, when the write cache level LV_C exceeds a reference level, the storage controller 110 may increase the cache processing rate for the write cache and/or may decrease the command fetch rate. Thereby, the write data stored in the buffer memory device 130 may be flushed (e.g., moved) relatively quickly to the NVM device 120, and thus, an available write cache may be secured in the buffer memory device 130. An operation method of the storage device 100 is described with reference to the following drawings.

Figure 2:
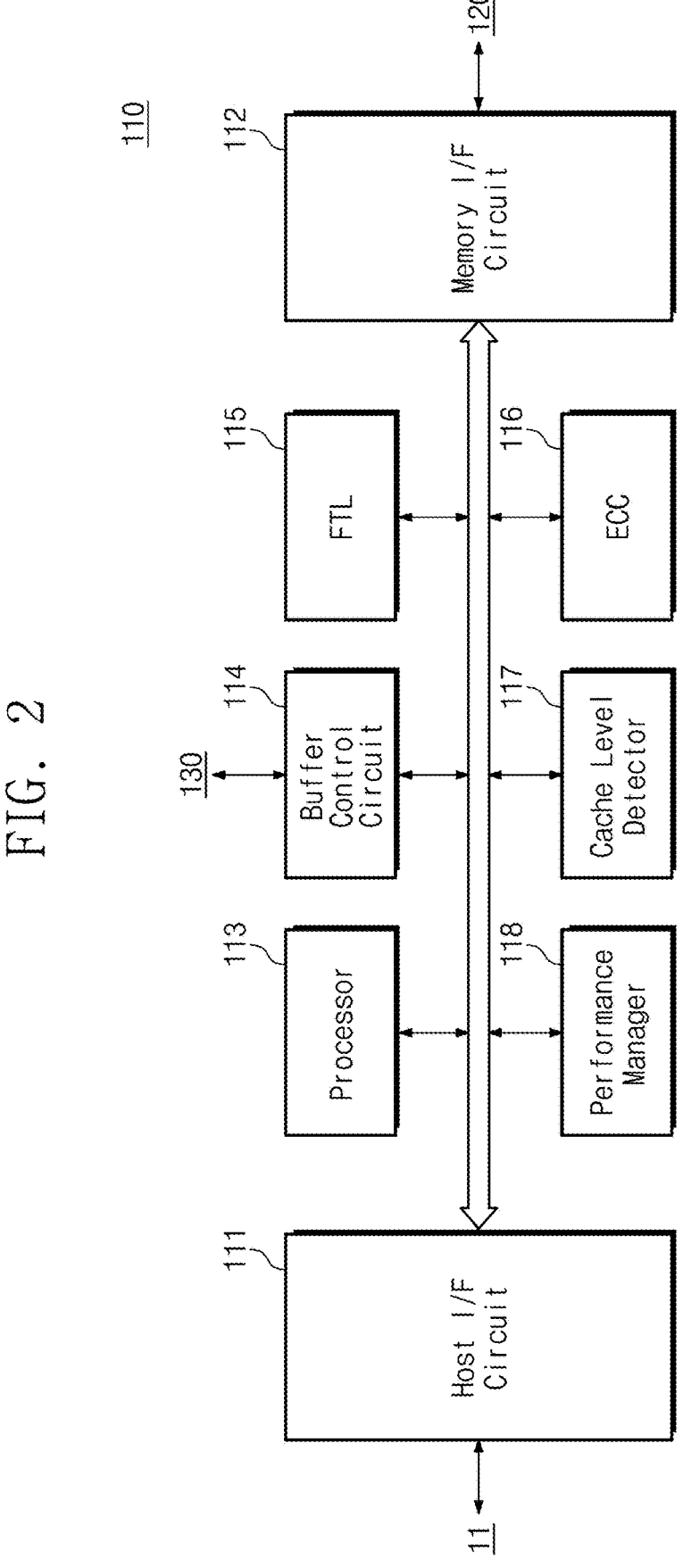
FIG. 2 is a block diagram illustrating a storage controller of FIG. 1, according to an embodiment.

FIG. 2 is a block diagram illustrating a storage controller 110 of FIG. 1. Referring to FIGS. 1 and 2, the storage controller 110 may include a host interface (I/F) circuit 111, a memory I/F circuit 112, a processor 113, a buffer control circuit 114, a flash translation layer (FTL) 115, an error correction code (ECC) engine 116, a cache level detector 117, and a performance manager 118.

The host I/F circuit 111 may communicate with the host device 11. In an embodiment, the host I/F circuit 111 may be configured to comply with an interface, a communication protocol, or a communication standard defined in advance between the host device 11 and the storage device 100. For example, in an embodiment, the host I/F circuit 111 may be configured to comply with an NVMe standard. However, the present disclosure is not limited thereto, and the host I/F circuit 111 may be configured to comply with one or more other communication standards and/or protocols.

The memory I/F circuit 112 may be configured to access and/or control the NVM device 120. For example, the memory I/F circuit 112 may control the NVM device 120 to read data stored in the NVM device 120 and/or to write data in the NVM device 120. In an embodiment, the memory I/F circuit 112 may include a flash controller configured to control the NVM device 120. In an embodiment, the memory I/F circuit 112 may be configured to comply with a given interface, communication protocol, or communication standard. The given interface, communication protocol, or communication standard may be and/or may include a standard protocol such as Toggle, open NAND flash interface (ONFI), or the like. However, the present disclosure is not limited thereto, and the memory I/F circuit 112 may comply with one or more other communication protocols and/or standards.

The processor 113 may control an overall operation of the storage controller 110.

The buffer control circuit 114 may be configured to control the buffer memory device 130. For example, the buffer control circuit 114 may store data in the buffer memory device 130 and/or may read data stored in the buffer memory device 130.

The FTL 115 may perform various functions and/or operations for using the NVM device 120 in an efficient manner. For example, the storage controller 110 may receive a logical address from the host device 11. The FTL 115 may perform an address translation operation and/or an address mapping operation such that the logical address may be translated into a physical address that may be used to store data in the NVM device 120. Alternatively or additionally, the FTL 115 may perform a wear leveling operation of balancing erase counts such that a specific memory block of the NVM device 120 may be prevented from excessively deteriorating. Alternatively or additionally, the FTL 115 may perform a garbage collection operation of securing an available memory blocks of the NVM device 120 by copying valid data of a first memory block of the NVM device 120 to a second memory block of the NVM device 120 and erasing the first memory block of the NVM device 120.

In an embodiment, the functions and/or operations that may be performed by the FTL 115 may be implemented in the form of software and/or firmware and may be driven by the processor 113. In an embodiment, the FTL 115, a part of the FTL 115, and/or functions and/or operations that may be performed by the FTL 115 may be implemented in the form of hardware. The operations and/or configurations of the FTL 115 and/or the way to implement the FTL 115 are provided as examples, and the present disclosure is not limited thereto.

In an embodiment, operations (e.g., an address mapping operation, a wear leveling operation, and a garbage collection operation) that may be performed by the FTL 115 may be performed in the storage device 100 without a request of the host device 11. Information and/or data that may be used for the functions and/or operations performed by the FTL 115 may be stored in a specific region of the buffer memory device 130.

The ECC engine 116 may be configured to correct an error of data read from the NVM device 120. For example, the ECC engine 116 may generate parity information associated with write data to be stored in the NVM device 120. As another example, the generated parity information may be stored in the NVM device 120 together with the write data. The ECC engine 116 may be configured to correct an error of data read from the NVM device 120, based on the read data and the relevant parity information that may have been stored with the read data.

The cache level detector 117 may be configured to detect the usage of a specific region of the buffer memory device 130. For example, the buffer memory device 130 may include a write cache region 132. Write data received from the host device 11 may be temporarily stored in the write cache region 132. When the write data is temporarily stored in the write cache region 132, the storage controller 110 may transmit a done response to the host device 11. Accordingly, the latency of the write operation may be reduced. The cache level detector 117 may detect the usage of the write cache region 132 of the buffer memory device 130. The usage of the write cache region 132 may indicate the size of a region of the write cache region 132, in which write data not stored in the NVM device 120 may be present. In some embodiments, the usage of the write cache region 132 may be referred to as a write cache level.

The performance manager 118 may be configured to control processing of information and/or data stored in the buffer memory device 130. For example, the buffer memory device 130 may include a write cache region 132 and an internal traffic region 134. As described above, the write cache region 132 may be a region in which write data to be stored in the NVM device 120 may be present. The internal traffic region 134 may be a region in which information and/or data used in various functions and/or operations to be performed by the FTL 115 may be stored.

The processing for the write cache region 132 may include an operation of flushing and/or storing the write data present in the write cache region 132 to the NVM device 120. When the write data is flushed from the write cache region 132 to the NVM device 120, the write cache region 132 where the write data was present may be released, and thus, an available write cache region 132 may be secured. The processing for the internal traffic region 134 may include various maintenance operations (e.g., a garbage collection operation, a wear leveling operation, or the like) that may be performed by using data and/or information stored in the internal traffic region 134. In an embodiment, the processing for the write cache region 132 may be referred to as cache processing, and the processing for the internal traffic region 134 may be referred to as internal traffic processing.

The performance manager 118 may control the buffer memory device 130, and/or any other components, such that the internal traffic processing and the cache processing may be performed at a specific ratio (e.g., A:B, where A and B are positive integers greater than zero, A may represent an amount of internal traffic processing, and B may represent an amount of cache processing).

In an embodiment, performance of the storage device 100 may be reduced due to an occurrence of a condition (e.g., when the write cache level LV_C increases). The performance manager 118, according to an embodiment, may be provided with the write cache level LV_C from the cache level detector 117. In an embodiment, based on the write cache level LV_C, the performance manager 118 may increase a rate of the cache processing and/or may decrease a rate at which a write command may be fetched from the host device 11. Accordingly, the write cache region 132 may be secured, and the reduction of performance of the storage device 100 may be potentially reduced and/or prevented. The operation of the performance manager 118 is described with reference to the following drawings.

Figure 3A:
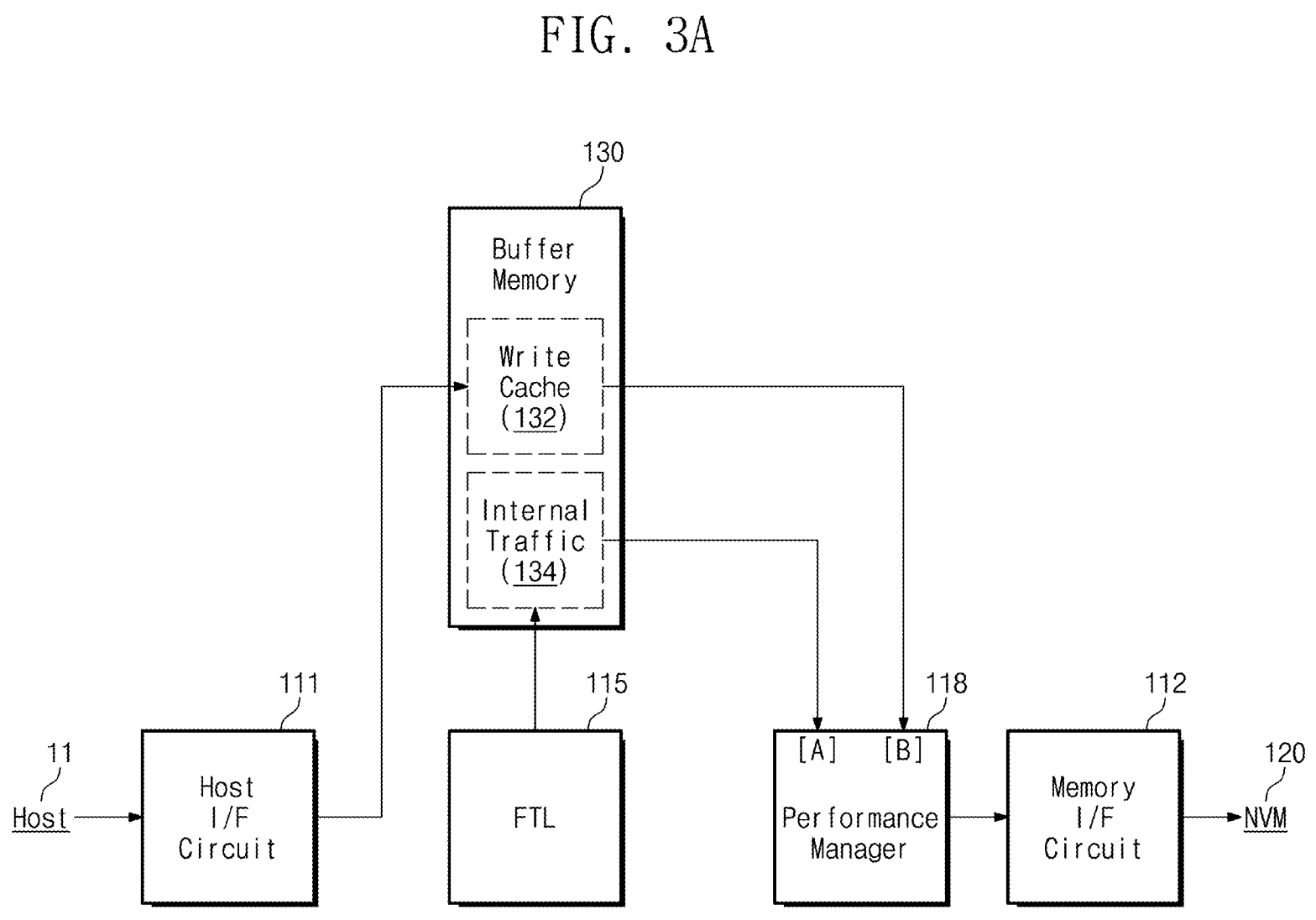
Figure 3B:
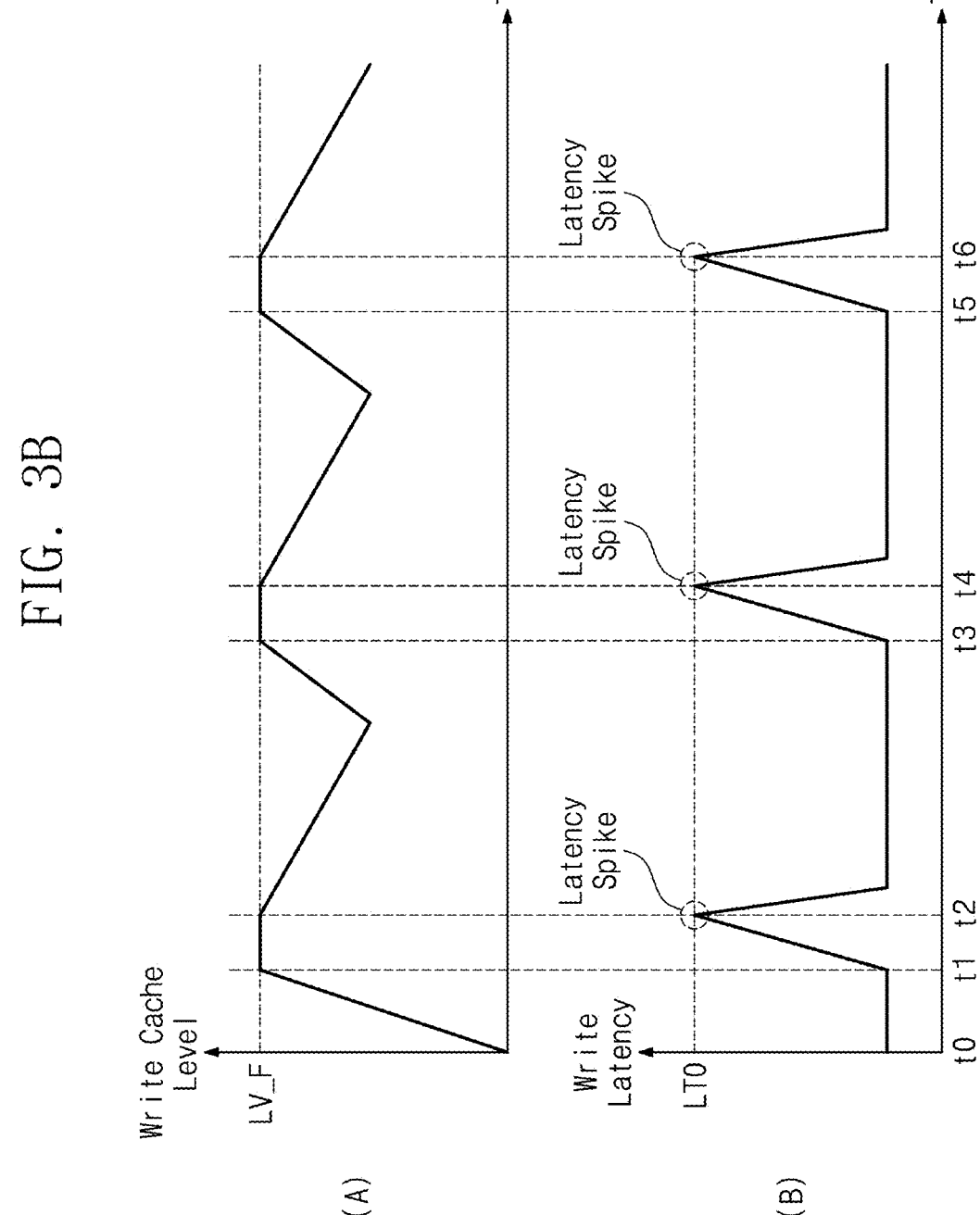

FIGS. 3A and 3B are diagrams for describing a write operation of the storage device 100. For convenience of description, components that may be unnecessary to describe a write operation of the storage device 100 may be omitted. In an embodiment, in the graph (A) shown on the top of FIG. 3B, the horizontal axis represents a time, and the vertical axis represents a write cache level LV_C, and in the graph (B) shown on the bottom of FIG. 3B, the horizontal axis represents a time, and the vertical axis represents a write latency.

In an embodiment, a host device 11 may perform a continuous write operation on the storage device 100. In such an embodiment, continuous write data may be provided to the storage device 100. However, the present disclosure is not limited thereto. For example, the host device 11 and the storage device 100 may operate based on various use environments, user scenarios, design constraints, or the like.

Referring to FIGS. 3A and 3B, a buffer memory device 130 may include a write cache region 132 and an internal traffic region 134. The write cache region 132 may be and/or may include a region that may be used to temporarily store write data received from the host device 11. For example, a host I/F circuit 111 may fetch a write command and write data from the host device 11. The write data may be stored in the write cache region 132 of the buffer memory device 130.

The internal traffic region 134 may be and/or may include a region that may be used to store information and/or data that may be necessary for a maintenance operation of the storage device 100. For example, the FTL 115 may perform various maintenance operations for a goal of using the storage device 100 in an efficient manner. The information and/or data that may be necessary for various maintenance operations of the FTL 115 may be stored in the internal traffic region 134.

In an embodiment, the write cache region 132 and the internal traffic region 134 may be distinguished from each other physically and/or logically in the buffer memory device 130.

A performance manager 118 may process the information and/or data stored in the buffer memory device 130. For example, the performance manager 118 may write the write data stored in the write cache region 132 of the buffer memory device 130 in a NVM device 120 through a memory I/F circuit 112. Alternatively or additionally, the performance manager 118 may perform a maintenance operation on the NVM device 120 through the memory I/F circuit 112, based on the information and/or data stored in the internal traffic region 134.

In an embodiment, the performance manager 118 may perform the processing for the internal traffic region 134 and the processing for the write cache region 132 at a ratio of A:B. For example, the performance manager 118 may process data with the magnitude of A per unit time with regard to the internal traffic region 134, and may process data with the magnitude of B per unit time with regard to the write cache region 132. Alternatively or additionally, the performance manager 118 may perform the processing for the internal traffic region 134 by using tokens, the number of which is A, and may perform the processing for the write cache region 132 by using tokens, the number of which is B. In an embodiment, the ratio of A:B may be determined based on a performance indicator of the storage device 100. For example, the ratio of A:B may be determined based on a write amplification factor (WAF) of the storage device 100. As an example, the ratio of A:B may be determined as a ratio of 1:(WAF−1). However, the present disclosure is not limited thereto, and the ratio may be determined based on other factors.

In an embodiment, when write requests and/or write commands are continuously fetched from the host device 11, the write cache region 132 of the storage device 100 may become insufficient, thereby potentially causing the reduction of performance of the storage device 100. For example, as illustrated in graph (A) of FIG. 3B, when the write request and/or write command is continuously fetched from the host device 11, the write cache level LV_C of the write cache region 132 of the buffer memory device 130 may increase. For example, at a first time point t1, the write cache level LV_C may reach a maximum level LV_F. As the write cache level LV_C reaches the maximum level LV_F, a delay of the write operation may be caused. That is, as shown in graph (B) of FIG. 3B, the write latency may increase from a first time point t1, and a write latency spike (or peak) may be caused at a second time point t2. Subsequently (e.g., after time point t2), the number of write requests and/or write commands may decrease, and consequently, the write cache level LV_C may decrease. However, when the number of write requests and/or write commands increases again (e.g., at time point t3), the write cache level LV_C may again increase. For example, in a time period from third time point t3 to fourth time point t4, the write cache level LV_C may reach the maximum level LV_F, and another write latency spike may be caused. Similarly, in a time period from fifth time point t5 to sixth time point t6, the write cache level LV_C may again reach the maximum level LV_F, and another write latency spike may be caused.

That is, in a particular user scenario (e.g., a situation where a continuous write request and/or write command event occurs), the write cache level LV_C may reach the maximum level LV_F, and as a result, a reduction of performance may be caused due to an increase in the write latency and/or a write latency spike.

Figure 4:
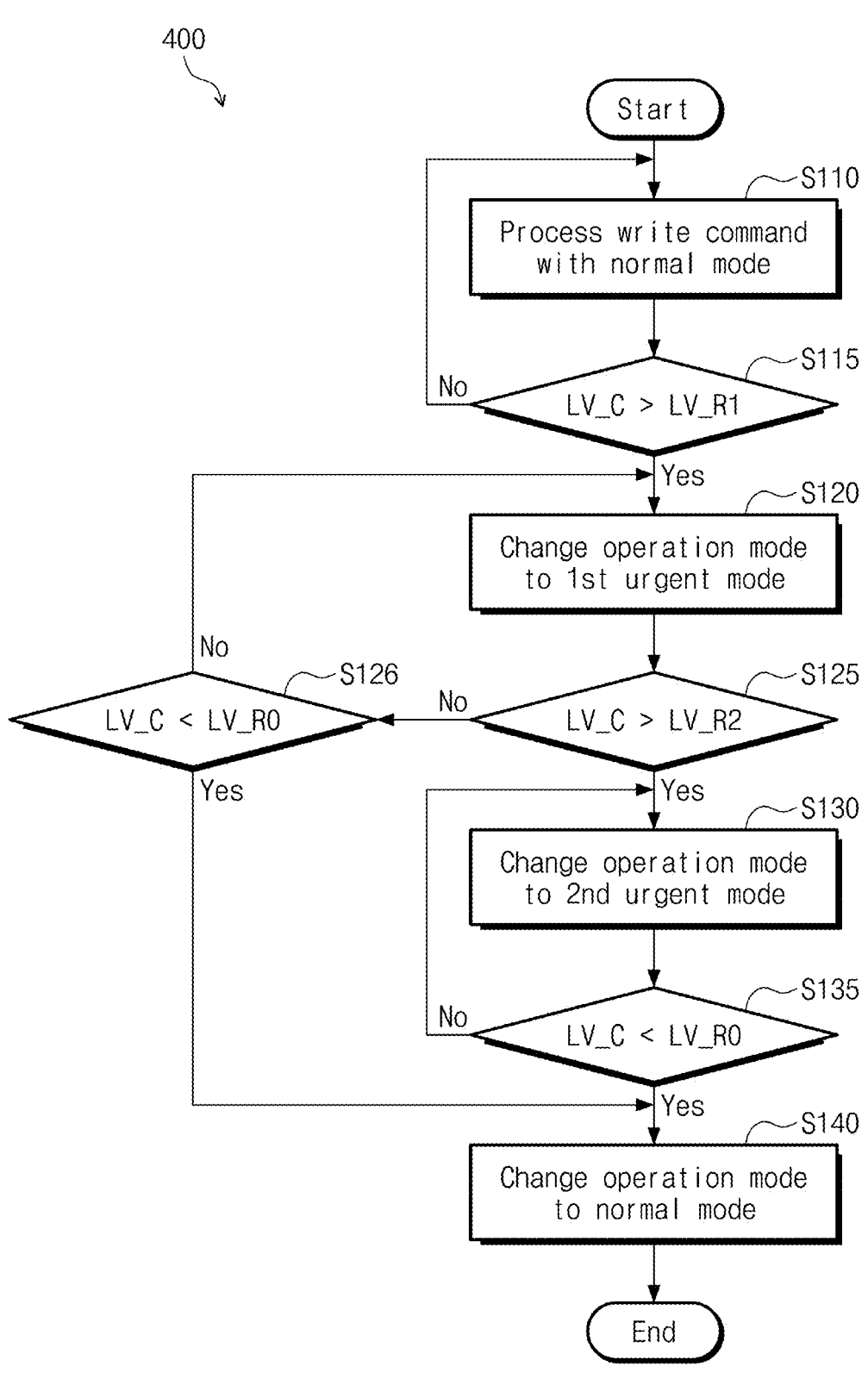
FIG. 4 is a flowchart illustrating an operation of a storage device of FIG. 1, according to an embodiment.

FIG. 4 is a flowchart illustrating an operation of a storage device 100 of FIG. 1, according to an embodiment. In an embodiment, the storage device 100 may operate in various modes based on the write cache level LV_C, as shown in the flowchart 400 of FIG. 4. For example, the storage device 100 may control the cache processing rate, the throughput of the write cache region 132, and/or the command fetch rate, depending on various modes.

In operation S110, the storage device 100 may process a write command by using a normal mode. For example, the storage controller 110 may fetch the write command from the host device 11 at a 0-th fetch rate and may store write data corresponding to the write command in the write cache region 132 of the buffer memory device 130. Subsequently, the storage controller 110 may transmit a done response to the fetched write command to the host device 11. That is, the storage controller 110 may perform processing for the write cache region 132 based on the 0-th cache processing rate.

In operation S115, the storage device 100 may determine whether a write cache level LV_C is higher (e.g., greater) than a first reference level LV_R1. For example, the first reference level LV_R1 may be a level lower than the maximum level LV_F of the write cache level LV_C.

When the write cache level LV_C is not higher than the first reference level LV_R1 (No at operation S115), the storage device 100 may perform operation S110 (e.g., may process the write request by using the normal mode).

When the write cache level LV_C is higher than the first reference level LV_R1 (Yes at operation S115), the storage device 100 may change the operation mode to a first urgent mode. The storage device 100 may operate in the first urgent mode. For example, when the storage device 100 operates in the first urgent mode, the storage device 100 may fetch a write command from the host device 11 based on a first fetch rate and may store write data corresponding to the fetched write command in the write cache region 132. Alternatively or additionally, when the storage device 100 operates in the first urgent mode, the storage device 100 may perform the processing for the write cache region 132 based on a first cache processing rate.

That is, compared to the normal mode, when the storage device 100 operates in the first urgent mode, a write command may be fetched at a relatively slower rate, and the processing for the write cache region 132 may be performed at a relatively faster rate. In such an embodiment, the write cache level LV_C may decrease, and/or the increase of the write cache level LV_C may decrease (e.g., slow down).

In operation S125, the storage device 100 may determine whether the write cache level LV_C is higher (e.g., greater) than a second reference level LV_R2. In an embodiment, the second reference level LV_R2 may be higher than the first reference level LV_R1.

When the write cache level LV_C is higher than the second reference level LV_R2 (Yes at operation S125), in operation S130, the storage device 100 may change the operation mode to a second urgent mode. The storage device 100 may operate in the second urgent mode. For example, when the storage device 100 operates in the second urgent mode, the storage device 100 may fetch a write command from the host device 11 based on a second fetch rate and may store write data corresponding to the fetched write command in the write cache region 132. Alternatively or additionally, when the storage device 100 operates in the second urgent mode, the storage device 100 may perform the processing for the write cache region 132 based on a second cache processing rate. In an embodiment, the second fetch rate may be slower than the first fetch rate. The second cache processing rate may be faster than the first cache processing rate.

In operation S135, the storage device 100 may determine whether the write cache level LV_C is lower (e.g., smaller) than a 0-th reference level LV_R0. In an embodiment, the 0-th reference level LV_R0 may be lower than the first reference level LV_R1. Alternatively or additionally, the 0-th reference level LV_R0 may be the same as the first reference level LV_R1. When the write cache level LV_C is not lower than the 0-th reference level LV_R0 (No at operation S135), the storage device 100 may continue to operate based on the second urgent mode. When the write cache level LV_C is lower than the 0-th reference level LV_R0 (Yes at operation S135), in operation S140, the storage device 100 may change the operation mode to the normal mode.

In an embodiment, when the storage device 100 determines, in operation S125, that the write cache level LV_C is not higher than the second reference level LV_R2 (No in operation S125), in operation S126, the storage device 100 may determine whether the write cache level LV_C is lower than the 0-th reference level LV_R0. When the write cache level LV_C is not lower than the 0-th reference level LV_R0 (No in operation S126), the storage device 100 may continue to operate based on the first urgent mode. When the write cache level LV_C is lower than the 0-th reference level LV_R0 (Yes in operation S126), the storage device 100 may perform operation S140 and return to the normal mode.

In an embodiment, when the storage device 100 operates in the first urgent mode or the second urgent mode, the write cache level LV_C may decrease. In such an embodiment, because the change to the normal mode may be made based on the 0-th reference level LV_R0 being relatively low, the change to the normal mode may be made in a state where the storage device 100 secures a stably available write cache level LV_C.

In an embodiment, the storage device 100 may change the operation mode based on the level (e.g., the write cache level LV_C) of the write cache region 132 of the buffer memory device 130. Depending on the operation mode, the storage device 100 may vary a fetch rate at which the write command is fetched from the host or a cache processing rate at which the processing for the write cache region 132 is performed. In such an embodiment, when the fetch rate becomes slower and/or the cache processing rate increases, the increase (rise) of the write cache level LV_C may decrease (e.g., slow down), and/or the write cache level LV_C may become lower (e.g., decrease). Accordingly, the write cache level LV_C of the write cache region 132 may be prevented from reaching the maximum value, and a reduction of performance of the storage device 100 may be prevented and/or reduced.

Figure 5:
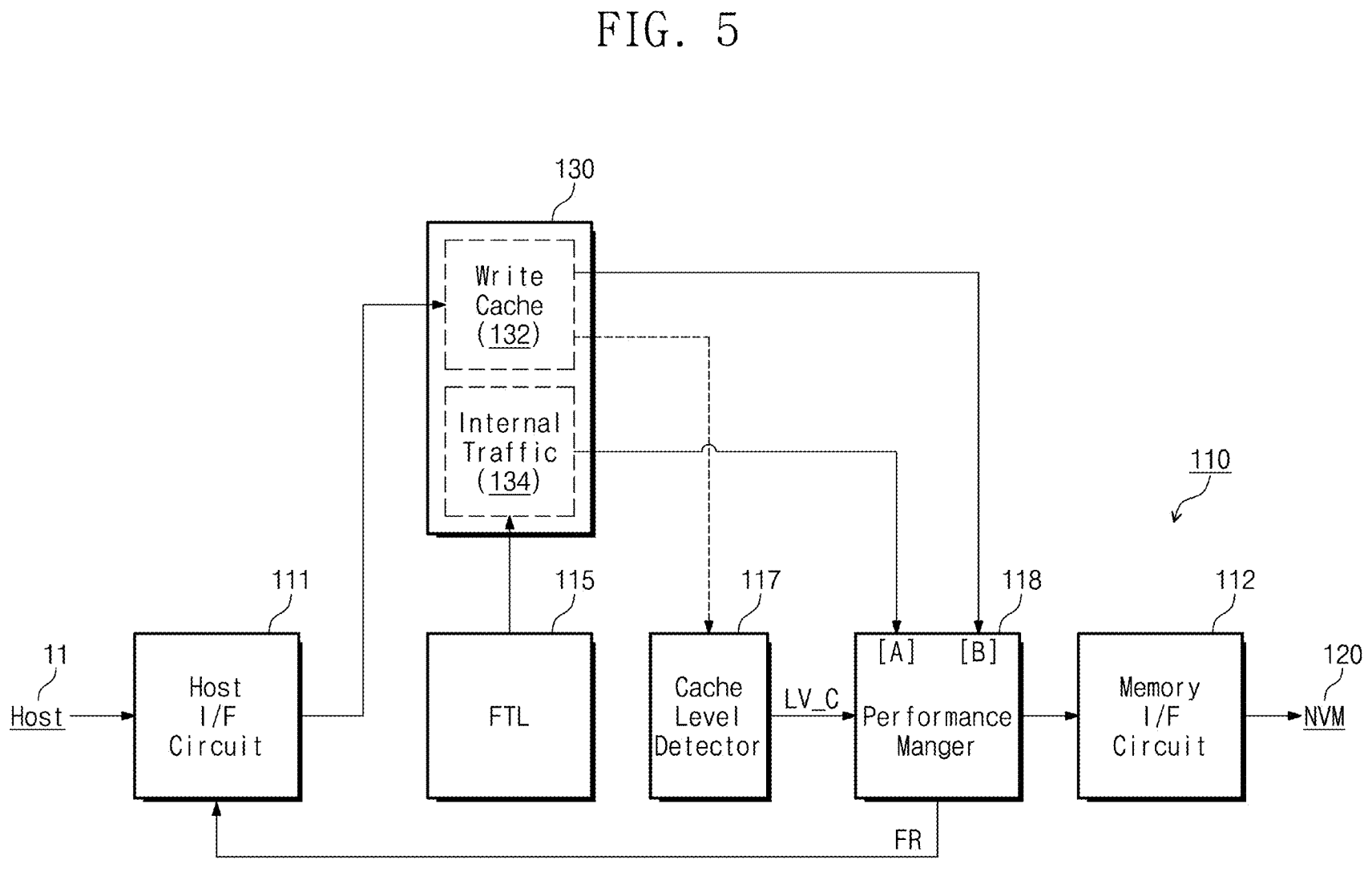

FIG. 5 is a diagram for describing an operation of the storage device 100, according to the flowchart of FIG. 4, according to an embodiments. For convenience of description, unnecessary components may be omitted. Referring to FIGS. 1, 2, and 5, the host I/F circuit 111 of the storage controller 110 may fetch a write command from the host device 11. Write data corresponding to the fetched write command may be stored in the write cache region 132 of the buffer memory device 130.

The FTL 115 may perform various maintenance operations for using the NVM device 120 in an efficient manner. Data that may be used in various maintenance operations may be stored in the internal traffic region 134 of the buffer memory device 130.

The performance manager 118 may process the information and/or data stored in the buffer memory device 130. For example, the performance manager 118 may write the write data stored in the write cache region 132 of the buffer memory device 130 in the NVM device 120 through the memory I/F circuit 112. Alternatively or additionally, the performance manager 118 may perform a maintenance operation on the NVM device 120 through the memory I/F circuit 112, based on the information and/or data stored in the internal traffic region 134 of the buffer memory device 130.

In an embodiment, the write cache region 132 and the internal traffic region 134 may be distinguished from each other physically and/or logically in the buffer memory device 130.

In an embodiment, the performance manager 118 may perform the internal traffic processing and the write cache processing at the ratio of A:B. In an embodiment, the performance manager 118 may vary the ratio of the internal traffic processing and the write cache processing based on the write cache level LV_C. Alternatively or additionally, the performance manager 118 may control a fetch rate FR based on the write cache level LV_C.

For example, the cache level detector 117 may detect the write cache level LV_C of the write cache region 132 of the buffer memory device 130. The performance manager 118 may operate in various operation modes based on the write cache level LV_C. The performance manager 118 may control the cache processing rate (e.g., B) and/or the fetch rate FR depending on an operation mode. For example, as the write cache level LV_C increases, the cache processing rate B may increase. Alternatively or additionally, in the ratio of A:B, the magnitude of B (e.g., the cache processing rate) may increase. Alternatively or additionally, as the write cache level LV_C increases, the fetch rate FR may decrease. Accordingly, as the cache processing rate B and the fetch rate FR are actively controlled based on the write cache level LV_C, the write cache level LV_C may be prevented from reaching the maximum value, and the reduction of performance of the storage device 100 may be prevented and/or reduced.

Figure 6:
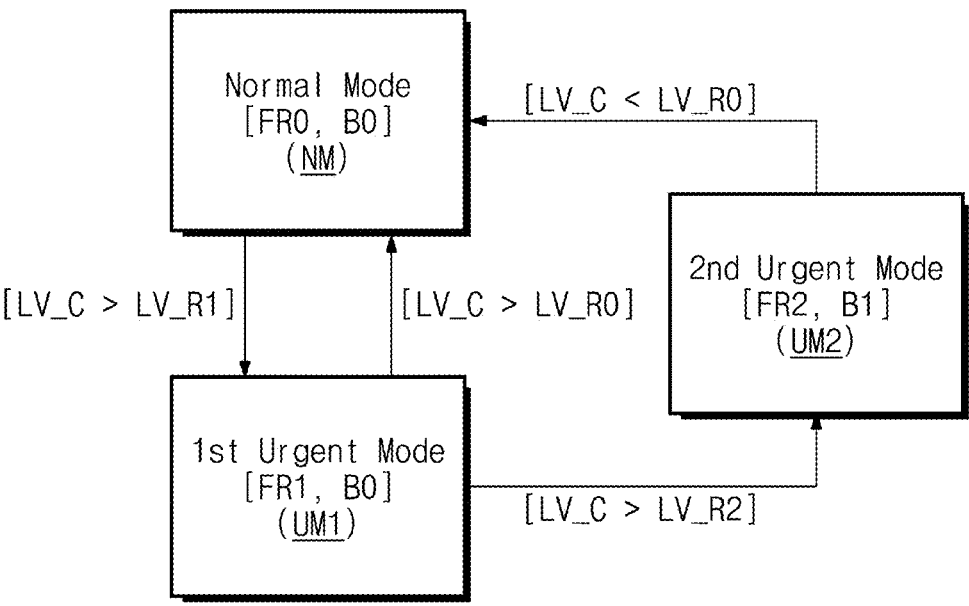
FIG. 6 is a diagram for describing an operation mode of a storage device of FIG. 5, according to an embodiment.

FIG. 6 is a diagram for describing an operation mode of a storage device 100 of FIG. 5. Referring to FIGS. 1, 2, 5, and 6, the storage device 100 may operate in a normal mode NM, a first urgent mode UM1, or a second urgent mode UM2, as shown in the diagram 600 of FIG. 6.

In the normal mode NM, the storage device 100 may fetch a write command from the host device 11 based on a 0-th fetch rate FR0 and may store write data corresponding to the fetched write command in the write cache region 132 of the buffer memory device 130. In the normal mode NM, the storage device 100 may perform write cache processing with respect to the write data stored in the write cache region 132, based on a 0-th cache processing rate B0.

When the write command and/or the write request is continuously issued from the host device 11, the write cache level LV_C may become higher than the first reference level LV_R1. In such an example, the storage device 100 may change the operation mode to the first urgent mode UM1. In the first urgent mode UM1, the storage device 100 may fetch a write command from the host device 11 based on a first fetch rate FR1 and may store write data corresponding to the fetched write command in the write cache region 132 of the buffer memory device 130. In the first urgent mode UM1, the storage device 100 may perform write cache processing with respect to the write data stored in the write cache region 132, based on the 0-th cache processing rate B0.

In an embodiment, the first fetch rate FR1 may be slower than the 0-th fetch rate FR0. That is, when the write cache level LV_C is higher than the first reference level LV_R1, the storage device 100 may decrease the fetch rate at which a write command is fetched from the host device 11. In such an embodiment, because a rate at which write data is written in the write cache region 132 decreases, the write cache level LV_C of the write cache region 132 may decrease, and/or the increase of the write cache level LV_C may decrease.

In an embodiment, while the storage device 100 operates in the first urgent mode UM1, the write cache level LV_C may become lower than the 0-th reference level LV_R0. In such an embodiment, the storage device 100 may change the operation mode to the normal mode NM. In an embodiment, the 0-th reference level LV_R0 may be lower than the first reference level LV_R1. In an embodiment, the 0-th reference level LV_R0 may be substantially similar and/or the same as the first reference level LV_R1.

In an embodiment, while the storage device 100 operates in the first urgent mode UM1, the write cache level LV_C may become higher than the second reference level LV_R2. In such an embodiment, the storage device 100 may change the operation mode to the second urgent mode UM2. In an embodiment, the second reference level LV_R2 may be higher than the first reference level LV_R1.

In the second urgent mode UM2, the storage device 100 may fetch a write command from the host device 11 based on a second fetch rate FR2 and may store write data corresponding to the fetched write command in the write cache region 132 of the buffer memory device 130. In the second urgent mode UM2, the storage device 100 may perform write cache processing with respect to the write data stored in the write cache region 132, based on a first cache processing rate B1.

In an embodiment, the second fetch rate FR2 may be slower than the first fetch rate FR1. That is, when the write cache level LV_C is higher than the second reference level LV_R2, the storage device 100 may further decrease the fetch rate at which a write command is fetched from the host device 11. In such an embodiment, because a rate at which write data is written in the write cache region 132 decreases, the write cache level LV_C of the write cache region 132 may decrease, and/or the increase of the write cache level LV_C may decrease.

In an embodiment, the first cache processing rate B1 may be faster than the 0-th cache processing rate B0. That is, when the write cache level LV_C is higher than the second reference level LV_R2, the storage device 100 may perform the write cache processing at a relatively faster rate. In such an embodiment, because an available capacity of the write cache region 132 may be secured more quickly, the write cache level LV_C of the write cache region 132 may decrease.

In an embodiment, while the storage device 100 operates in the second urgent mode UM2, the write cache level LV_C may become lower than the 0-th reference level LV_R0. In such an embodiment, the storage device 100 may change the operation mode to the normal mode NM.

Figure 7:
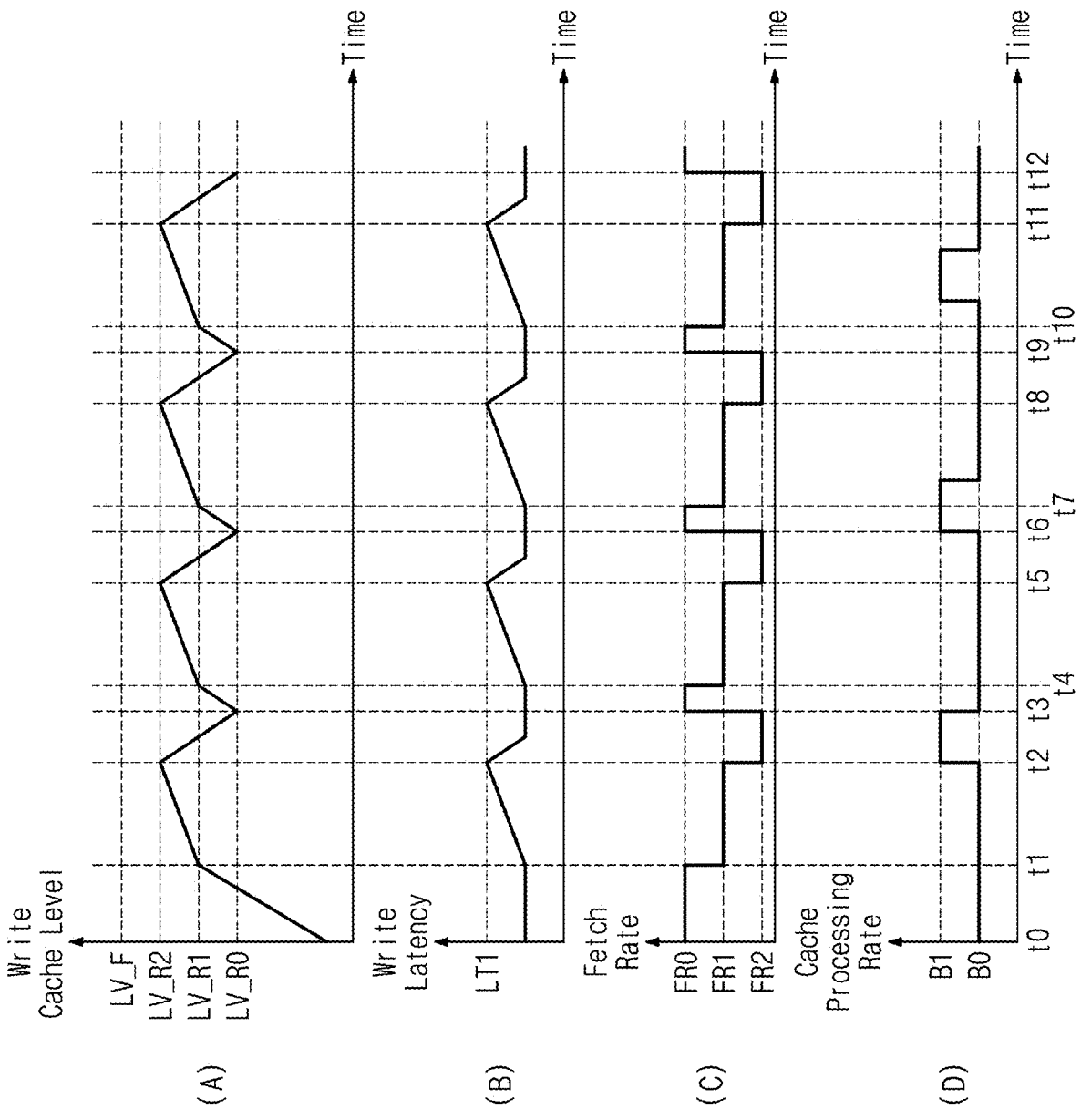
FIG. 7 illustrates graphs for describing an operation of a storage device according to FIG. 6, according to an embodiment.

FIG. 7 illustrates graphs for describing an operation of the storage device 100, according to FIG. 6, according to an embodiment. In the graph (A) shown in FIG. 7, the horizontal axis represents a time, and the vertical axis represents a write cache level LV_C. In the graph (B) shown on FIG. 7, the horizontal axis represents a time, and the vertical axis represents a write latency. In the graph (C) shown on FIG. 7, the horizontal axis represents a time, and the vertical axis represents a fetch rate. In the graph (D) shown on FIG. 7, the horizontal axis represents a time, and the vertical axis represents a cache processing rate.

As shown in FIG. 7, during a time period from zeroth time point t0 to first time point t1, the storage device 100 may operate in the normal mode NM. That is, during the time period from zeroth time point t to first time point t1, the storage device 100 may fetch a write command from the host device 11 based on the 0-th fetch rate FR0 and may perform write cache processing with respect to the write cache region 132 based on the 0-th cache processing rate B0. While the storage device 100 operates in the normal mode NM, when the write request is continuously issued from the host device 11 and/or the write command is continuously fetched from the storage device 100, the write cache level LV_C may increase.

At the first time point t1, the write cache level LV_C may reach the first reference level LV_R1. The storage device 100 may change the operation mode to the first urgent mode UM1. For example, the performance manager 118 of the storage controller 110 may change the fetch rate of the host I/F circuit 111 from the 0-th fetch rate FR0 to the first fetch rate FR1. The first fetch rate FR1 may be slower than the 0-th fetch rate FR0. In such an embodiment, because the fetch rate of the write command becomes slower, the increase of the write cache level LV_C may decrease.

At the second time point t2, the write cache level LV_C may reach the second reference level LV_R2, and the storage device 100 may change the operation mode to the second urgent mode UM2. For example, the performance manager 118 of the storage controller 110 may change the fetch rate of the host I/F circuit 111 from the first fetch rate FR1 to the second fetch rate FR2. The second fetch rate FR2 may be slower than the first fetch rate FR1. The performance manager 118 of the storage controller 110 may change the cache processing rate from the 0-th cache processing rate B0 to the first cache processing rate B1. The first cache processing rate B1 may be faster than the 0-th cache processing rate B0.

In an embodiment, when the write command is fetched from the host device 11 at a relatively slower rate and the write cache processing for the write cache region 132 is performed at a relatively faster rate, an available capacity of the write cache region 132 may be secured more quickly. That is, while the storage device 100 operates in the second urgent mode UM2, the write cache level LV_C may decrease.

At a third time point t3, the write cache level LV_C may reach the 0-th reference level LV_R0, and the storage device 100 may change the operation mode to the normal mode NM. In a time period from third time point t3 to twelfth time point t12, as in the above description, the storage device 100 may vary the operation mode based on the write cache level LV_C, and thus, an available write cache region 132 may be secured before the write cache level LV_C reaches the maximum level LV_F.

In an embodiment, as the fetch rate becomes relatively slower while the storage device 100 operates in the first urgent mode UM1, the write latency may increase. However, compared to the spike of the write latency when the write cache level LV_C of FIG. 3B is the maximum level LV_F, a maximum level LT1 of the write latency of FIG. 7 may become lower. That is, a reduction of performance of the storage device 100 may be prevented and/or may be reduced.

Although the storage device 100 is described as operating based on one of the normal mode NM, the first urgent mode UM1, and the second urgent mode UM2, and a fetch rate and a cache processing rate according to each mode have specific values, the present disclosure is not limited thereto. For example, the storage device 100 may operate in one of a plurality of operation modes based on the write cache level LV_C. In such an example, as the write cache level LV_C increases (e.g., an available capacity of the write cache region 132 decreases), a fetch rate of a relevant operation mode may decrease, and a cache processing rate of the relevant operation mode may increase. Alternatively or additionally, the storage device 100 may vary a fetch rate and a cache processing rate based on the write cache level LV_C. As the write cache level LV_C increases, the fetch rate may decrease, and the cache processing rate may increase.

Figure 8:
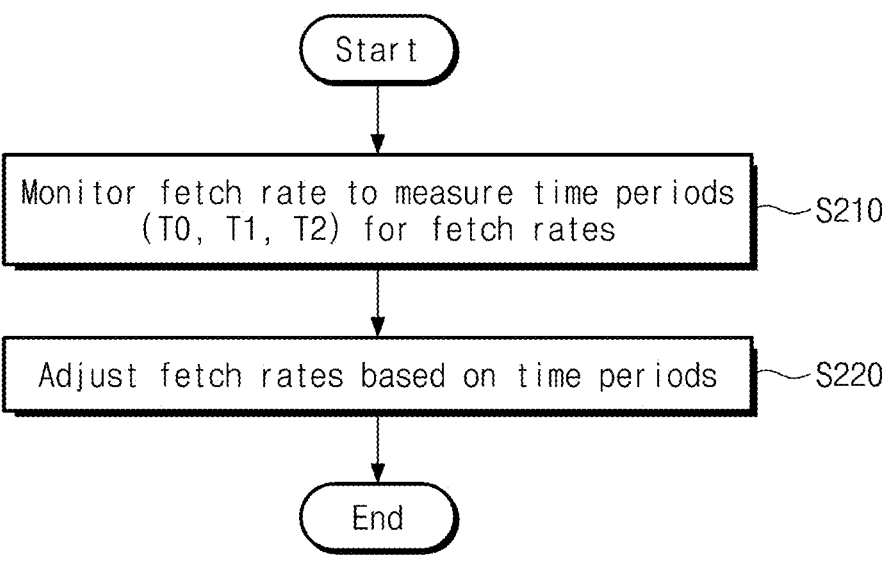
FIG. 8 is a flowchart illustrating an operation of a storage device of FIG. 1, according to an embodiment.
Figure 9:
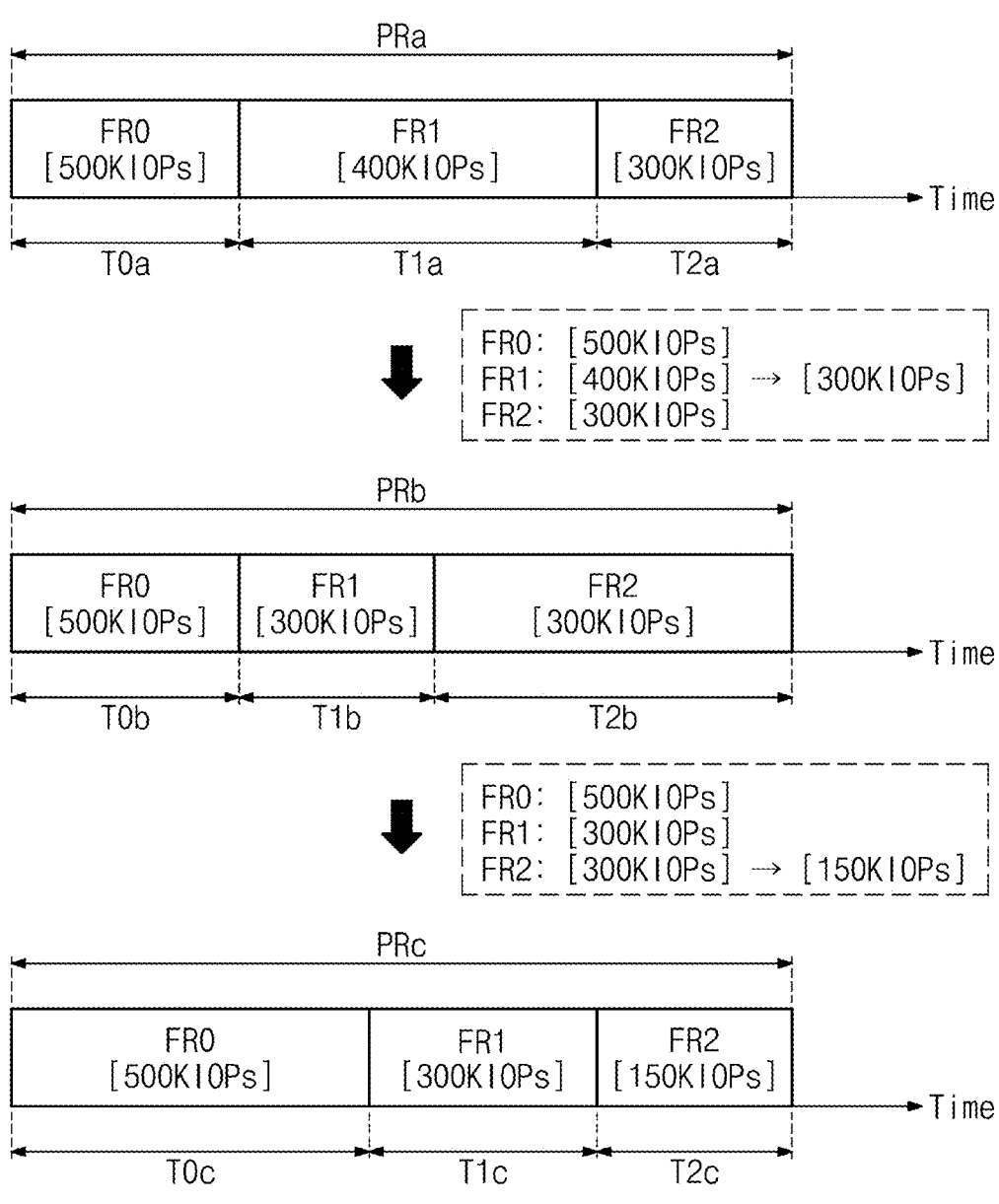
FIG. 9 is a diagram for describing an operation according to the flowchart of FIG. 8, according to an embodiment.

FIG. 8 is a flowchart illustrating an operation of the storage device 100 of FIG. 1, according to an embodiment. FIG. 9 is a diagram for describing an operation according to the flowchart of FIG. 8, according to an embodiment. As described with reference to FIGS. 4 to 7, the storage device 100 may operate in one of various operation modes depending on the write cache level LV_C. For example, a fetch rate may vary depending on an operation mode. In an embodiment, the storage device 100 may vary a fetch rate corresponding to each operating mode through operations of the flowchart of FIG. 8.

Referring to FIGS. 1, 2, 8, and 9, in operation S210, the storage device 100 may monitor a fetch rate to measure time periods (e.g., zeroth time period TO, first time period T1, and second time period T2) of respective fetch rates. That is, the storage device 100 may measure the zeroth to second time periods T0 to T2 in which respective fetch rates may be maintained.

*In operation S220, the storage device 100 may adjust the fetch rates based on the measured zeroth to second time periods T0 to T2. For example, as illustrated in FIG. 9, it may be assumed that the 0-th fetch rate FR0 is 500 kilo input/output (I/O) operations (KIOPs), the first fetch rate FR1 is 400 KIOPs, and the second fetch rate FR2 is 300 KIOPs. During a first time period PRa, a time period during which the storage device 100 operates at the 0-th fetch rate FR0 may be T0a, a time period during which the storage device 100 operates at the first fetch rate FR1 may be T1a, and a time period during which the storage device 100 operates at the second fetch rate FR2 may be T2**a.

In an embodiment, the time period T1a may be relatively longer than the time periods T0a and T2a. Such a condition (e.g., T1a>T0a and T1a>T2a) may indicate that a time during which the storage device 100 operates in the first urgent mode UM1 may be relatively long. That is, the time period T1a being relatively longer than the time periods T0a and T2a may indicate that a time during which the write cache level LV_C is maintained at a relatively high level is relatively long. Consequently, the performance of the storage device 100 may deteriorate somewhat.

In an embodiment, a relatively long time period may be decreased by decreasing a fetch rate corresponding to the time period. For example, when the time period T1a is relatively longer than the time periods T0a and T2a, the first fetch rate FR1 corresponding to the time period T1a may be changed (decreased) from 400 KIOPs to 300 KIOPs. In another example, during a time period PRb whose length is substantially similar and/or the same as that of the time period PRa, a time period during which the storage device 100 operates at the 0-th fetch rate FR0 may be T0b, a time period during which the storage device 100 operates at the first fetch rate FR1 may be T1b, and a time during which the storage device 100 operates at the second fetch rate FR2 may be T2b. In such an example, the time period T2b may be relatively longer than the time periods T0b and T1b (e.g., T2b>T0b and T2b>T1b).

In an embodiment, the second fetch rate FR2 corresponding to the time period T2b may be changed (decreased) from 300 KIOPs to 150 KIOPs. In such an embodiment, during a time period PRc whose length is substantially similar and/or the same as that of the time period PRa and/or PRb, a time period during which the storage device 100 operates at the 0-th fetch rate FR0 may be T0c, a time period during which the storage device 100 operates at the first fetch rate FR1 may be T1c, and a time period during which the storage device 100 operates at the second fetch rate FR2 may be T2c. In such an embodiment, the time period T0c may be relatively longer than the time periods T1c and T2c (e.g., T0c>T1c and T0c>T2c). As a result, a time during which the storage device 100 operates in the normal mode NM may be relatively long. That is, the time period T0c being relatively longer than the time periods T1c and T2c may indicate that a time during which the write cache level LV_C is maintained at a relatively lower level may be relatively long. In such an example, a performance reduction of the storage device 100 may be prevented and/or reduced.

Figure 10:
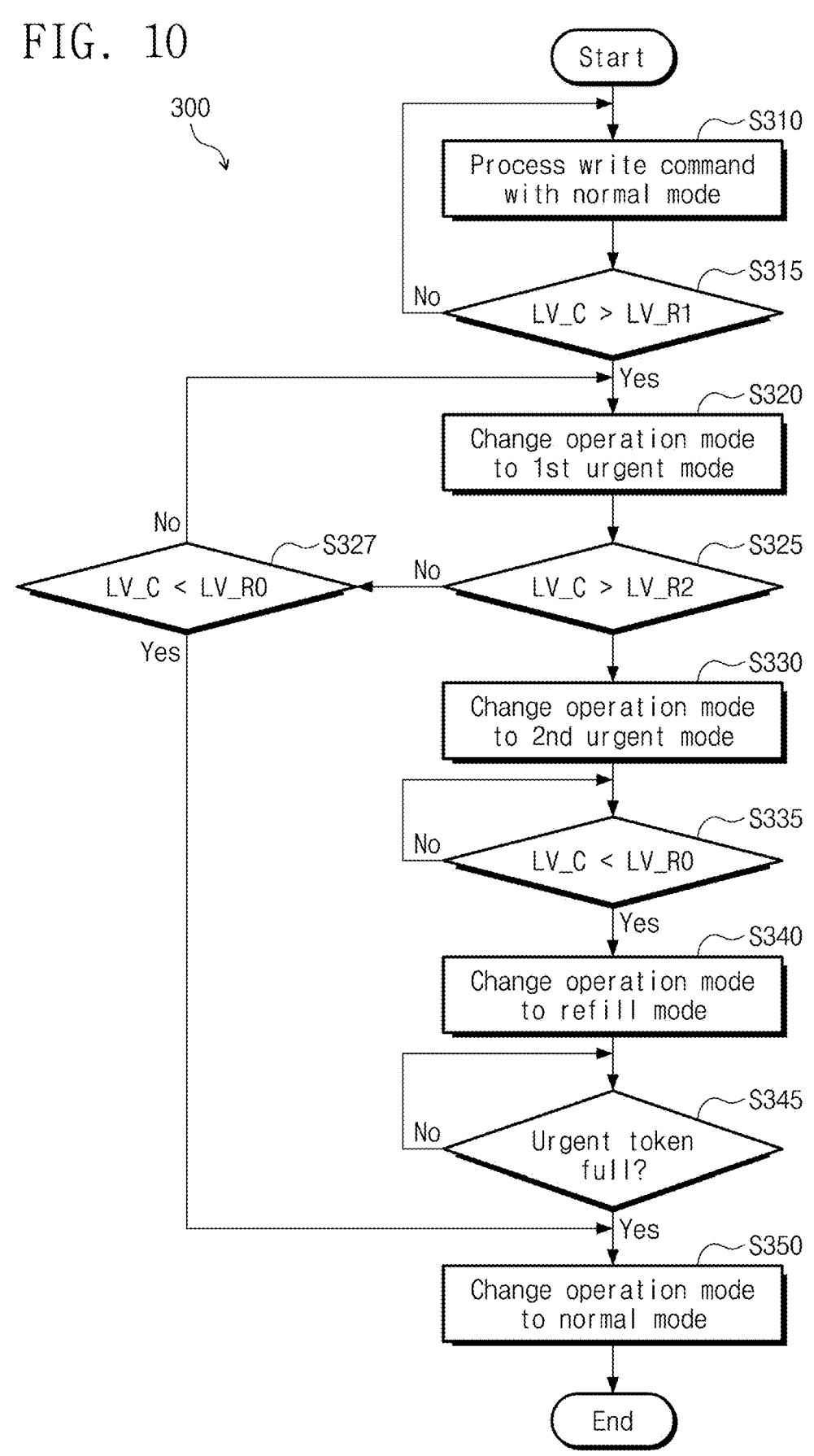
FIG. 10 is a flowchart illustrating an operation of a storage device of FIG. 1, according to an embodiment.

FIG. 10 is a flowchart 300 illustrating an operation of the storage device 100 of FIG. 1, according to an embodiment. Referring to FIGS. 1 and 10, the storage device 100 may perform operations S310 to S335. Operations S310 to S335 may include and/or may be similar in many respects to the operations S110 to S140 described with reference to FIG. 4, and may include additional features not mentioned above. Consequently, repeated descriptions of operations S310 to S335 described above with reference to FIG. 4 may be omitted for the sake of brevity.

When the storage device 100 determines in operation S335 that the write cache level LV_C is lower than the 0-th reference level LV_R0 (Yes in operation S335), in operation S340, the storage device 100 may operate in a refill mode. For example, the storage device 100 may operate in one of the normal mode NM, the first urgent mode UM1, and the second urgent mode UM2 depending on the write cache level LV_C. In an embodiment, a cache processing rate may be variable depending on each operation mode. The performance manager 118 may perform an internal traffic processing and a write cache processing based on a token manner. When the cache processing rate increases, the performance manager 118 may perform write cache processing by using an urgent token. That is, as more tokens are used for write cache processing, the cache processing rate may increase. In an embodiment, the urgent token may include tokens allocated and/or reserved for the urgent mode from among tokens determined based on the performance of the storage device 100.

When the write cache level LV_C becomes lower than the 0-th reference level LV_R0 (e.g., when an available write cache region 132 is secured), the performance manager 118 may be configured to refill the urgent token used. In an embodiment, in the refill mode, the storage device 100 may be configured to refill the urgent token used in the first urgent mode UM1 or the second urgent mode UM2. In such an example, in the refill mode, the storage device 100 may fetch a write command from the host device 11 based on the 0-th fetch rate FR0 and may perform write cache processing with respect to the on the 0-th cache processing rate B0. Accordingly, as the write command is fetched at a relatively slow rate, the write cache level LV_C may be prevented from increasing, and/or as the write cache processing is performed at a relatively slow rate, the urgent token may be refilled.

In operation S345, the storage device 100 may determine whether the urgent token is completely refilled. When the urgent token is not completely refilled (e.g., when the urgent token is not full) (No in operation S345), the storage device 100 may continue to operate in the refill mode.

When the urgent token is completely refilled (e.g., when the urgent token is full) (Yes in operation S350), the storage device 100 may operate in the normal mode NM.

The storage device 100 and/or the storage controller 110, according to an embodiment, may operate in various operation modes based on the write cache level LV_C and/or may control a fetch rate and a cache processing rate depending on an operation mode. In such an embodiment, the performance manager 118 of the storage controller 110 may perform internal traffic processing and write cache processing based on the token manner. When the cache processing rate increases, the performance manager 118 may increase the cache processing rate by performing write cache processing by using the urgent token. When the write cache level LV_C becomes lower than the 0-th reference level LV_R0, the performance manager 118 may refill the urgent token.

Figure 11:
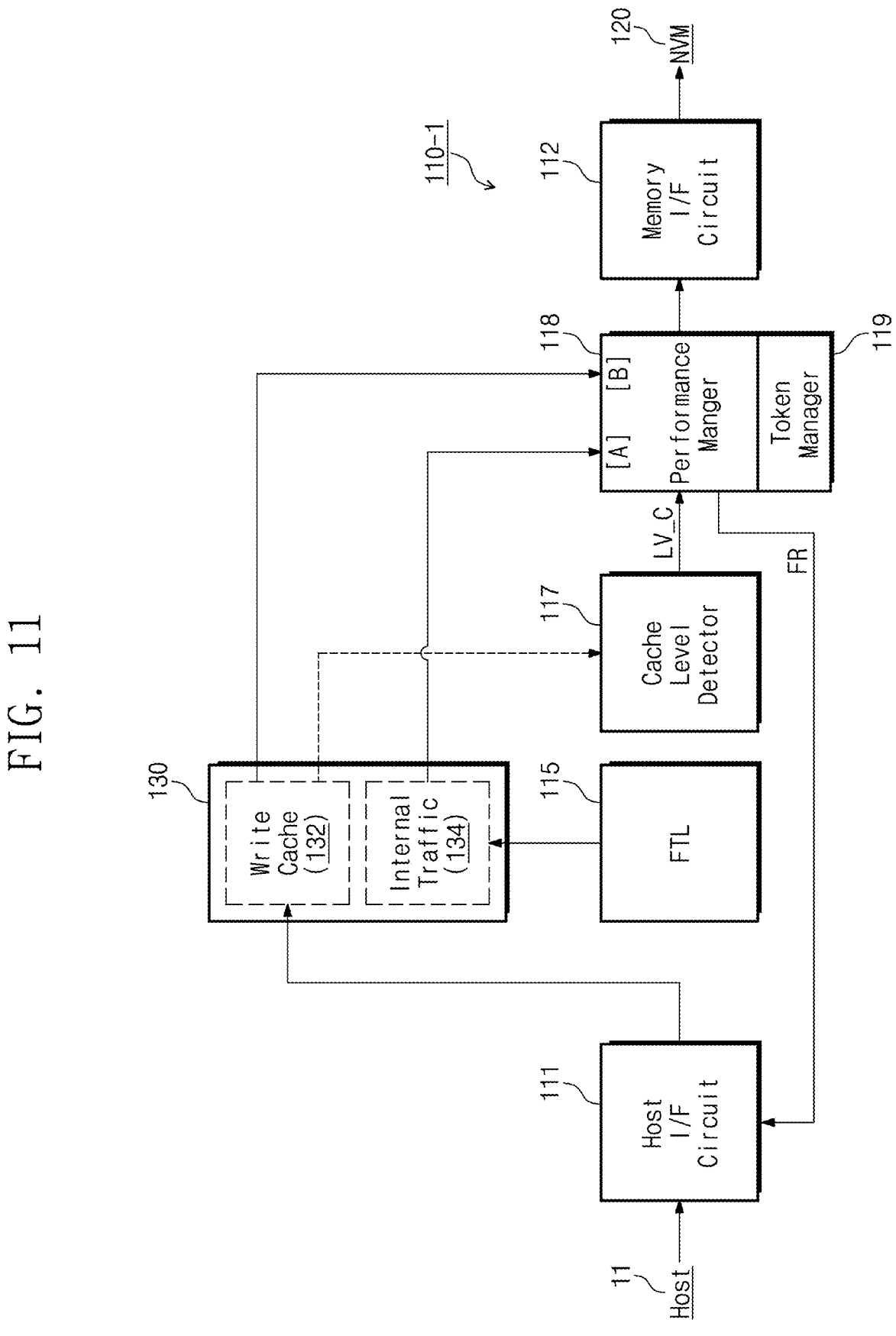
FIG. 11 is a diagram for describing an operation according to the flowchart of FIG. 10, according to an embodiment.

FIG. 11 is a diagram for describing an operation according to the flowchart of FIG. 10. The buffer memory device 130, the host I/F circuit 111, the memory I/F circuit 112, the FTL 115, the cache level detector 117, and the performance manager 118 of FIG. 11 may include and/or may be similar in many respects to the buffer memory device 130, the host I/F circuit 111, the memory I/F circuit 112, the FTL 115, the cache level detector 117, and the performance manager 118 described above with reference to FIGS. 1 to 10, and may include additional features not mentioned above. Consequently, repeated descriptions of the buffer memory device 130, the host I/F circuit 111, the memory I/F circuit 112, the FTL 115, the cache level detector 117, and the performance manager 118 described above with reference to FIGS. 1 to 10 may be omitted for the sake of brevity.

In an embodiment, a storage controller 110-1 may further include a token manager 119. The token manager 119 may provide a token to the performance manager 118 such that internal traffic processing and write cache processing may be performed at the ratio of A:B. In an embodiment, the token manager 119 may provide the performance manager 118 with internal tokens for internal traffic processing and write tokens for write cache processing, and the ratio of the number of internal tokens and the number of write tokens may be A:B.

In an embodiment, when the operation mode of the storage device 100 is changed, the cache processing rate B for write cache processing may be variable. In such an embodiment, the performance manager 118 may perform write cache processing by using the urgent token provided from the token manager 119. As such, because the total number of tokens for write cache processing increases, the cache processing rate may increase, and/or the ratio of write cache processing may increase.

FIG. 12 is a diagram for describing operations of a performance manager 118 and a token manager 119 of FIG. 11. Referring to FIGS. 1, 11, and 12, the storage device 100 may operate in the normal mode NM or the first urgent mode UM1. The token manager 119 may provide the performance manager 118 with an internal token A for internal traffic processing and a write token B for write cache processing at the ratio of A:B. The performance manager 118 may perform internal traffic processing and write cache processing by using the internal token A and the write token B provided from the token manager 119.

When the write cache level LV_C is higher than the second reference level LV_R2, the storage device 100 may operate in the second urgent mode UM2. In the second urgent mode UM2, for write cache processing, the token manager 119 may further provide an urgent token C. As such, the performance manager 118 may perform internal traffic processing by using the internal token A and may perform write cache processing by using the write token B and the urgent token C. That is, the internal traffic processing and the write cache processing may be performed at the ratio of A:(B+C). That is, as the number of times of write cache processing becomes relatively high (increases), the cache processing rate for write cache processing may further increase.

When the write cache level LV_C becomes lower than the 0-th reference level LV_R0, the storage device 100 may operate in the refill mode. In the refill mode, the token manager 119 may not provide the urgent token C to the performance manager 118 and may refill the urgent token C used. When the urgent token C is full by the token manager 119, the storage device 100 may again operate in the normal mode NM.

When the write cache level LV_C increases, the token manager 119 may further provide the urgent token C for write cache processing to the performance manager 118. In such an example, as the number of times that the performance manager 118 performs write cache processing increases, the cache processing rate for write cache processing may increase.

Although FIG. 12 describes the cache processing rate for write cache processing as being uniform in the normal mode NM and the first urgent mode UM1, the present disclosure is not limited thereto. For example, the cache processing rate of the normal mode NM and the cache processing rate of the first urgent mode UM1 may be different from each other, and the number of urgent tokens to be provided to the performance manager 118 may be adjusted depending on the increase of the cache processing rate.

Figure 13:
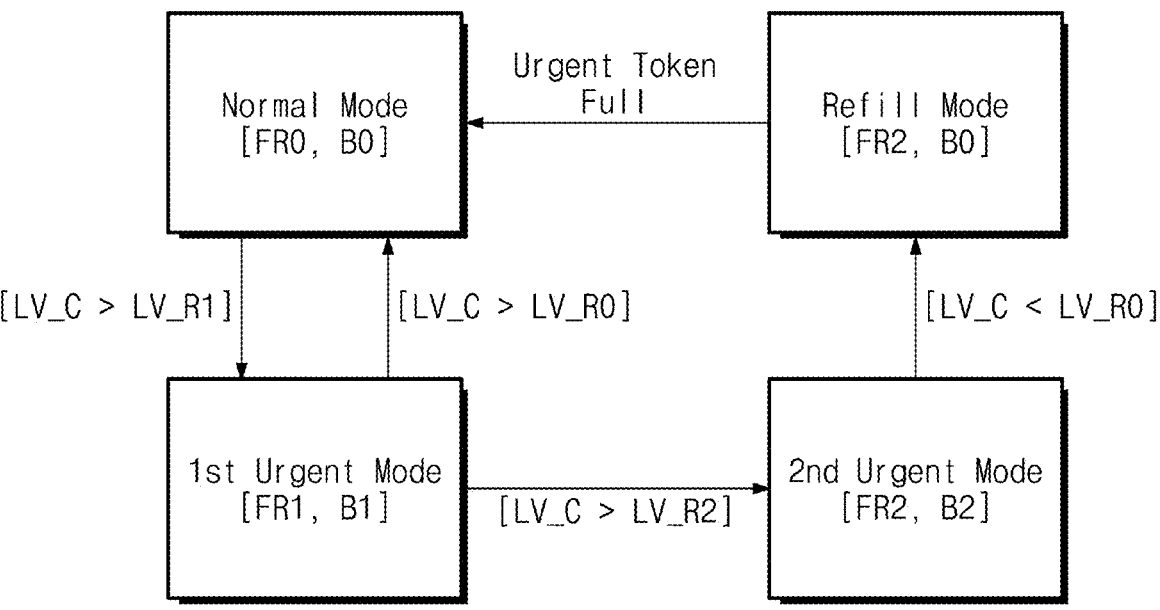
FIG. 13 is a diagram for describing changes to an operation mode of a storage device depending on the flowchart of FIG. 11, according to an embodiment.

FIG. 13 is a diagram for describing how an operation mode of the storage device 100 changes depending on the flowchart of FIG. 11, according to an embodiment. Referring to FIGS. 1, 11, and 13, the storage device 100 may operate in the normal mode NM. In the normal mode NM, the storage device 100 may operate based on the 0-th fetch rate FR0 and the 0-th cache processing rate B0.

The write cache level LV_C may become higher than the first reference level LV_R1 while the storage device 100 operates in the normal mode NM. In such an example, the storage device 100 may change the operation mode to the first urgent mode UM1. In the first urgent mode UM1, the storage device 100 may operate based on the first fetch rate FR1 and the first cache processing rate B1. In an embodiment, the first fetch rate FR1 may be lower than the 0-th fetch rate FR0. Alternatively or additionally, the first cache processing rate B1 may be faster than the 0-th cache processing rate B0.

In an embodiment, when the first cache processing rate B1 is faster than the 0-th cache processing rate B0, the token manager 119 of the storage controller 110 may provide a first urgent token to the performance manager 118. As the performance manager 118 performs write cache processing by using the first urgent token, the performance manager 118 may perform write cache processing at the first cache processing rate B1 being relatively faster.

The write cache level LV_C may become higher than the second reference level LV_R2 while the storage device 100 operates in the first urgent mode UM1. In such an example, the storage device 100 may change the operation mode to the second urgent mode UM2. In the second urgent mode UM2, the storage device 100 may operate based on the second fetch rate FR2 and a second cache processing rate B2. In an embodiment, the second fetch rate FR2 may be lower than the first fetch rate FR1. Alternatively or additionally, the second cache processing rate B2 may be faster than the first cache processing rate B1.

In an embodiment, when the second cache processing rate B2 is faster than the first cache processing rate B1, the token manager 119 of the storage controller 110 may provide a second urgent token to the performance manager 118. As the performance manager 118 performs write cache processing by using the second urgent token, the performance manager 118 may perform write cache processing at the second cache processing rate B2 being relatively faster. In an embodiment, when the first urgent token is used in the first urgent mode UM1 and the second cache processing rate B2 is faster than the first cache processing rate B1, the number of second urgent tokens may be more than the number of first urgent tokens.

The write cache level LV_C may become lower than the 0-th reference level LV_R0 while the storage device 100 operates in the second urgent mode UM2. In such an example, the storage device 100 may change the operation mode to the refill mode. In the refill mode, the storage device 100 may operate based on the second fetch rate FR2 and the 0-th cache processing rate B0. That is, because the fetch rate in the refill mode is slower than the fetch rate in the normal mode NM, the urgent token may be refilled within a range in which the write cache level LV_C does not increase. After the urgent token is completely refilled, the storage device 100 may operate in the normal mode NM.

In an embodiment, the write cache level LV_C may become lower than the 0-th reference level LV_R0 while the storage device 100 operates in the first urgent mode UM1. In such an embodiment, when the first cache processing rate B1 is substantially similar and/or the same as the 0-th cache processing rate B0 (e.g., when the first urgent token is not used), the storage device 100 may change the operation mode to the normal mode NM. Alternatively or additionally, when the first cache processing rate B1 is faster than the 0-th cache processing rate B0 (e.g., when the first urgent token is used), the storage device 100 may change the operation mode to the refill mode and may refill the urgent token used.

Figure 14:
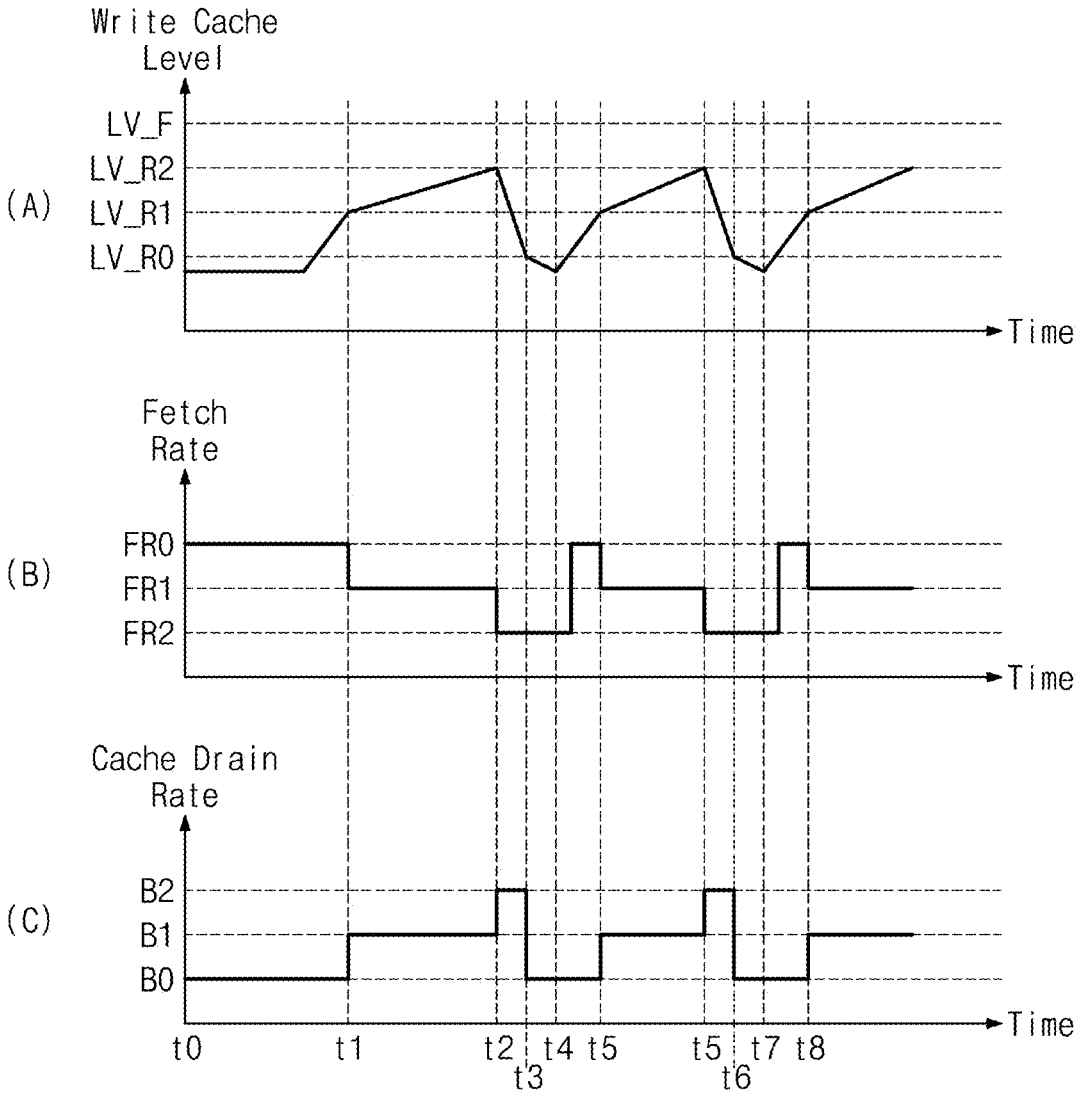
FIG. 14 illustrates graphs for describing an operation according to the flowchart of FIG. 10, according to an embodiment.

FIG. 14 illustrates graphs for describing an operation according to the flowchart of FIG. 10. In the graph (A) shown on the top of FIG. 14, the horizontal axis represents a time, and the vertical axis represents a write cache level. In the graph (B) shown on the center of FIG. 14, the horizontal axis represents a time, and the vertical axis represents a fetch rate. In the graph (C) shown on the bottom of FIG. 14, the horizontal axis represents a time, and the vertical axis represents a cache drain rate. For convenience of description, repeated descriptions which may have been provided with regard to the above components may be omitted.

Referring to FIGS. 1, 10, 11, and 14, during a time period from the zeroth time point t0 to the first time point t1, the storage device 100 may operate in the normal mode NM. That is, the storage device 100 may fetch a write command from the host device 11 based on the 0-th fetch rate FR0 and may store write data corresponding to the fetched write command in the write cache region 132 of the buffer memory device 130. The storage device 100 may flush the write data stored in the write cache region 132 to the NVM device 120 based on the 0-th cache processing rate B0 (e.g., may perform write cache processing).

At the first time point t1, the write cache level LV_C may become higher than the first reference level LV_R1, and the storage device 100 may change the operation mode to the first urgent mode UM1. For example, in the first urgent mode UM1, the storage device 100 may fetch a write command from the host device 11 based on the first fetch rate FR1 and may store write data corresponding to the fetched write command in the write cache region 132 of the buffer memory device 130. The storage device 100 may perform write cache processing based on the first cache processing rate B1. In such an example, the first fetch rate FR1 may be slower than the 0-th fetch rate FR0, and the first cache processing rate B1 may be faster than the 0-th cache processing rate B0.

At a second time point t2, the write cache level LV_C may reach the second reference level LV_R2, and the storage device 100 may change the operation mode to the second urgent mode UM2. For example, in the second urgent mode UM2, the storage device 100 may fetch a write command from the host device 11 based on the second fetch rate FR2 and may store write data corresponding to the fetched write command in the write cache region 132 of the buffer memory device 130. The storage device 100 may perform write cache processing based on the second cache processing rate B2. In an embodiment, the second fetch rate FR2 may be slower than the first fetch rate FR1, and the second cache processing rate B2 may be faster than the first cache processing rate B1.

During the second urgent mode UM2, because the storage device 100 fetches a write command at a relatively slow fetch rate and performs write cache processing at a relatively fast cache processing rate, an available capacity of the write cache region 132 may be quickly secured. Accordingly, during the second urgent mode UM2, the write cache level LV_C may decrease.

In an embodiment, the increase in the cache processing rate in the first urgent mode UM1 or the second urgent mode UM2 may be accomplished by using, at the performance manager 118 of the storage controller 110-1, the urgent token provided from the token manager 119.

At a third time point t3, the write cache level LV_C may become lower the 0-th reference level LV_R0, and the storage device 100 may operate in the refill mode. For example, in the refill mode, the storage device 100 may fetch a write command from the host device 11 based on the second fetch rate FR2 and may store write data corresponding to the fetched write command in the write cache region 132 of the buffer memory device 130. The storage device 100 may perform write cache processing based on the 0-th cache processing rate B0. During the refill mode, the storage device 100 may be configured to refill the urgent token used in the first urgent mode UM1 or the second urgent mode UM2.

At a fourth time point t4, the urgent token may be full, and the storage device 100 may operate in the normal mode NM. In a time period from the fourth time point t4 to ninth time point t9, as in the above description, the storage device 100 may operate depending on the write cache level LV_C.

FIG. 15 is a flowchart 1500 illustrating an operation of the storage device 100 of FIG. 1, according to an embodiment. In some embodiments, the storage device 100 may operate in various operating modes depending on the write cache level LV_C and may control a fetch rate or a cache processing rate depending on various operation modes. As such, the write cache level LV_C may be prevented from reaching the maximum value, and a performance reduction of the storage device 100 may be prevented and/or reduced. According to the embodiment of FIG. 15, the storage device 100 may control the fetch rate and/or the cache processing rate based on the write latency of the storage device 100.

Referring to FIGS. 1, 2, and 15, in operation S410, the storage device 100 may monitor the latency (e.g., write latency) of the storage device 100. For example, the host I/F circuit 111 of the storage controller 110 may be configured to monitor the write latency.

In operation S420, the storage device 100 may control the fetch rate and the cache processing rate based on the monitored latency. For example, an increase in the monitored latency may indicate that an available capacity of the write cache region 132 decreases and/or that the write cache level LV_C increases. Accordingly, in response to that the monitored latency increases, the storage device 100 may decrease the fetch rate and/or may increase the cache processing rate As a result, an available capacity of the write cache region 132 may be secured, and/or the write cache level LV_C may decrease. Alternatively or additionally, the storage device 100 may change the operation mode in response to the monitored latency being greater than a reference latency.

Figure 16:
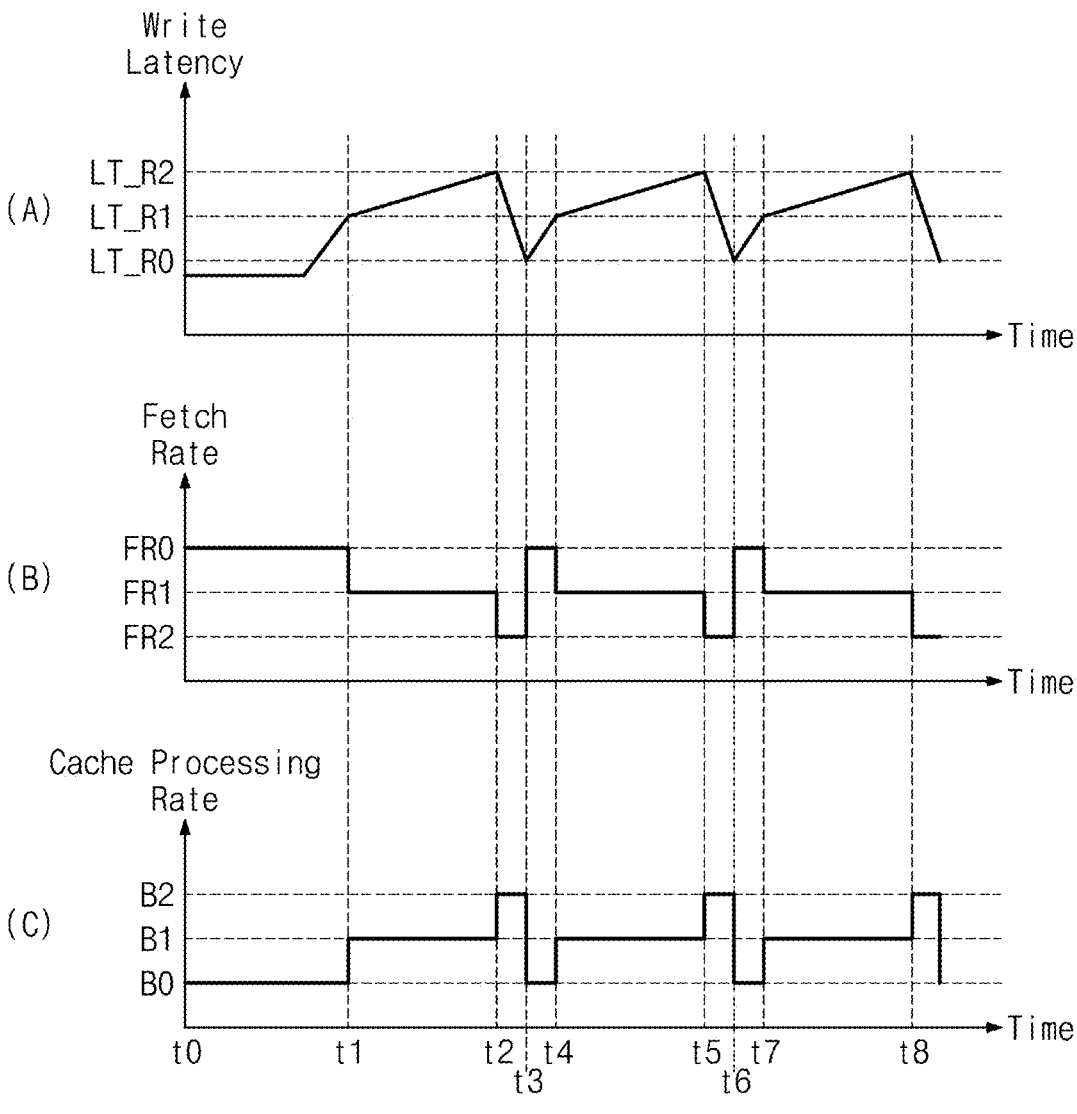
FIG. 16 illustrates graphs for describing an operation of a storage device according to FIG. 15, according to an embodiment.

FIG. 16 illustrates graphs for describing an operation of the storage device 100 according to FIG. 15, according to an embodiment. In the graph (A) shown on the top of FIG. 16, the horizontal axis represents a time, and the vertical axis represents a write latency. In the graph (B) shown on the center of FIG. 16, the horizontal axis represents a time, and the vertical axis represents a fetch rate. In the graph (C) shown on the bottom of FIG. 16, the horizontal axis represents a time, and the vertical axis represents a cache processing rate.

Referring to FIGS. 1, 15, and 16, during a time period from the zeroth time point t0 to the first time point t1, the storage device 100 may operate in the normal mode NM. For example, in the normal mode NM, the storage device 100 may fetch a write command from the host device 11 based on the 0-th fetch rate FR0 and may store write data corresponding to the fetched write command in the write cache region 132 of the buffer memory device 130. The storage device 100 may store the data stored in the write cache region 132 to the NVM device 120 based on the 0-th cache processing rate B0 and may release the write cache region 132 corresponding to the stored data.

At the first time point t1, a write latency LT_W may reach a first reference latency LT_R1. When the write latency LT_W reaches the first reference latency LT_R1, the storage device 100 may operate in the first urgent mode UM1. For example, in the first urgent mode UM1, the storage device 100 may fetch a write command from the host device 11 based on the first fetch rate FR1 and may store write data corresponding to the fetched write command in the write cache region 132 of the buffer memory device 130. The storage device 100 may store the data stored in the write cache region 132 to the NVM device 120 based on the first cache processing rate B1 and may release the write cache region 132 corresponding to the stored data. In an embodiment, the first fetch rate FR1 may be slower than the 0-th fetch rate FR0. In an embodiment, the first cache processing rate B1 may be faster than the 0-th cache processing rate B0.

At a second time point t2, the write latency LT_W may reach a second reference latency LT_R2. In an embodiment, the second reference latency LT_R2 may be greater than the first reference latency LT_R1. In such an embodiment, the storage device 100 may change the operation mode to the second urgent mode UM2. For example, in the second urgent mode UM2, the storage device 100 may fetch a write command from the host device 11 based on the second fetch rate FR2 and may store write data corresponding to the fetched write command in the write cache region 132 of the buffer memory device 130. The storage device 100 may store the data stored in the write cache region 132 to the NVM device 120 based on the second cache processing rate B2 and may release the write cache region 132 corresponding to the stored data. In an embodiment, the second fetch rate FR2 may be slower than the first fetch rate FR1. In an embodiment, the second cache processing rate B2 may be faster than the first cache processing rate B1.

When the storage device 100 operates in the second urgent mode UM2, because the write command is fetched at a relatively slow rate and write cache processing is performed at a relatively fast rate, the write latency LT_W may decrease.

At a third time point t3, the write latency LT_W may reach a 0-th reference latency LT_R0, and the storage device 100 may change the operation mode to the normal mode NM. In an embodiment, when the storage device 100 increases the cache processing rate by using the urgent token in the first urgent mode UM1 and/or the second urgent mode UM2, at the third time point t3, the storage device 100 may change the operation mode to the refill mode. After the urgent token is refilled, the storage device 100 may change the operation mode to the normal mode NM.

In a time period from the fourth time point t4 to the eighth time period t8, as in the above description, based on the write latency LT_W, the storage device 100 may change the operation mode and/or may control the fetch rate or the cache processing rate.

The above embodiments are for describing the characteristics of the present disclosure, however, the present disclosure is not limited thereto. For example, in the above embodiments, the description is given as the fetch rate or the cache processing rate being variable depending on various operation modes. However, in some operation modes, the fetch rate or the cache processing rate may be maintained in a substantially similar and/or the same level. Similarly, the write cache level LV_C and/or the write latency LT_W provided in the above embodiments is only an example, and it is to be understood that the write cache level LV_C or the write latency LT_W may be variously changed and/or modified depending on various user environments, user scenarios, or design constraints. In addition, although some embodiments may be described individually, but it is to be understood that the embodiments of the detailed description may be implemented independently of each other or that at least two embodiments may be combined.

Figure 17:
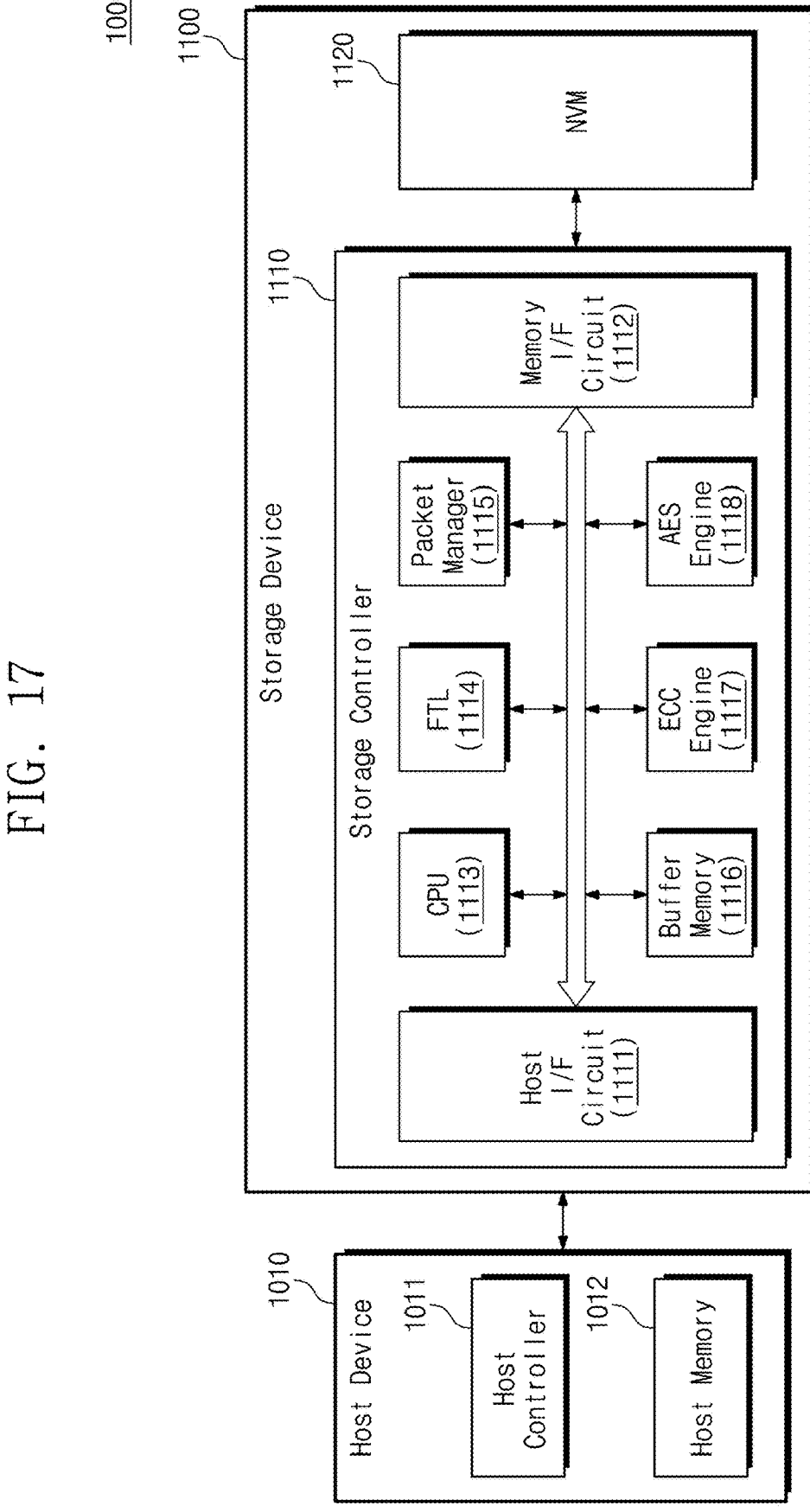
FIG. 17 is a block diagram illustrating a host-storage system, according to an embodiment.

FIG. 17 is a block diagram of a host storage system, according to an embodiment.

The host storage system 1000 may include a host device 1010 and a storage device 1100. Further, the storage device 1100 may include a storage controller 1110 and an NVM 1120. According to an example embodiment, the host device 1010 may include a host controller 1011 and a host memory 1012. The host memory 1012 may serve as a buffer memory configured to temporarily store data to be transmitted to the storage device 1100 and/or data received from the storage device 1100.

The storage device 1100 may include storage media configured to store data in response to requests from the host device 1010. For example, the storage device 1100 may include at least one of a solid state drive (SSD), an embedded memory, a removable external memory, or the like.

When the storage device 1100 is an SSD, the storage device 1100 may be and/or may include a device that conforms to at least one communication standard such as, but not limited to, an NVMe standard. When the storage device 1100 is an embedded memory and/or an external memory, the storage device 1100 may be and/or may include a device that conforms to at least one communication standard such as, but not limited to, a UFS standard, an eMMC standard, or the like. Each of the host device 1010 and the storage device 1100 may generate a packet according to an adopted standard protocol and may transmit the packet.

When the NVM 1120 of the storage device 1100 includes a flash memory, the flash memory may include a two-dimensional (2D) NAND memory array and/or a three-dimensional (3D) (or vertical) NAND (VNAND) memory array. As another example, the storage device 1100 may include various other kinds of NVMs. For example, the storage device 1100 may be and/or may include, but not be limited to, MRAM, spin-transfer torque (STT) MRAM, conductive bridging random access memory (CBRAM), ferroelectric random access memory (FRAM), phase-change random access memory (PRAM), resistive random access memory (RRAM), or other kinds of memories.

According to an embodiment, the host controller 1011 and the host memory 1012 may be implemented as separate semiconductor chips. Alternatively or additionally, in some embodiments, the host controller 1011 and the host memory 1012 may be integrated in the same semiconductor chip. As an example, the host controller 1011 may be any one of a plurality of modules included in an application processor (AP). The AP may be implemented as a System on Chip (SoC). Further, the host memory 1012 may be and/or may include an embedded memory included in the AP, an NVM, and/or a memory module located outside the AP.

The host controller 1011 may manage an operation of storing data (e.g., write data) of a buffer region of the host memory 1012 in the NVM 1120 and/or an operation of storing data (e.g., read data) of the NVM 1120 in the buffer region.

The storage controller 1110 may include a host I/F circuit 1111, a memory I/F circuit 1112, and a central processing unit (CPU) 1113. Further, the storage controller 1110 may further include an FTL 1114, a packet manager 1115, a buffer memory 1116, an ECC engine 1117, and an advanced encryption standard (AES) engine 1118. In an embodiment, the storage controller 1110 may further include a working memory in which the FTL 1114 is loaded. The CPU 1113 may execute the FTL 1114 to control data write and read operations on the NVM 1120.

The host I/F circuit 1111 may transmit and/or receive packets to and/or from the host device 1010. A packet transmitted from the host device 1010 to the host I/F circuit 1111 may include a command and/or data to be written to the NVM 1120. A packet transmitted from the host I/F circuit 1111 to the host device 1010 may include a response to the command and/or data read from the NVM 1120. The memory I/F circuit 1112 may transmit data to be written to the NVM 1120 to the NVM 1120 and/or receive data read from the NVM 1120. The memory I/F circuit 1112 may be configured to comply with at least one standard protocol, such as, but not limited to, Toggle, ONFI, or the like.

The FTL 1114 may perform various functions, such as, but not limited to, an address mapping operation, a wear-leveling operation, a garbage collection operation, or the like. The address mapping operation may refer to an operation of converting a logical address received from the host device 1010 into a physical address that may be used to store data in the NVM 1120. The wear-leveling operation may refer to a technique for preventing excessive deterioration of a specific block by allowing blocks of the NVM 1120 to be uniformly used. For example, the wear-leveling operation may be implemented using a firmware technique that may balance erase counts of physical blocks. The garbage collection operation may refer to a technique for ensuring usable capacity in the NVM 1120 by erasing an existing block after copying valid data of the existing block to a new block.

The packet manager 1115 may generate a packet according to a protocol of an interface, which may conform to the host device 1010, or parse various types of information from the packet received from the host device 1010. In addition, the buffer memory 1116 may temporarily store data to be written to the NVM 1120 and/or data to be read from the NVM 1120. Although the buffer memory 1116 may be a component included in the storage controller 1110, the buffer memory 1116 may be outside the storage controller 1110.

The ECC engine 1117 may perform error detection and correction operations on read data read from the NVM 1120. For example, the ECC engine 1117 may generate parity bits for write data to be written to the NVM 1120, and the generated parity bits may be stored in the NVM 1120 together with write data. During the reading of data from the NVM 1120, the ECC engine 1117 may correct an error in the read data by using the parity bits read from the NVM 1120 along with the read data, and output error-corrected read data.

The AES engine 1118 may perform at least one of an encryption operation and a decryption operation on data input to the storage controller 1110 by using a symmetric-key algorithm.

In an embodiment, the storage device 1100 may include and/or may be similar in many respects to the storage device 100 described with reference to FIGS. 1 to 16 and/or may operate based on the operation method described with reference to FIGS. 1 to 16, and may include additional features not mentioned above. In an embodiment, the buffer memory 1116 may include and/or may be similar in many respects to the buffer memory device 130 described with reference to FIGS. 1 to 16 and/or may include the write cache region 132 described with reference to FIGS. 1 to 16.

According to the present disclosure, a storage device may operate in various operation modes depending on how much a write cache region is used (e.g., depending on a write cache level). The storage device may control a command fetch rate and/or a cache processing rate depending on an operation mode. As such, the write cache level may be prevented from reaching the maximum value (e.g., an available capacity of the write cache region may be easily secured). As a result, a performance reduction of the storage device may be prevented and/or reduced. Accordingly, a storage device with improved performance and an operation method thereof are provided, when compared to related storage devices.

While the present disclosure has been described with reference to embodiments thereof, it is to be apparent to those of ordinary skill in the art that various changes and modifications may be made thereto without departing from the spirit and scope of the present disclosure as set forth in the following claims.

What is claimed is:

1. An operating method of a storage device, the operating method comprising:

fetching, from an external host device, write command and write data, based on an operating mode of the storage device from among a plurality of operating modes comprising a normal mode corresponding to a 0-th cache processing rate and a 0-th fetch rate, a first urgent mode corresponding to a first cache processing rate and a first fetch rate, and a second urgent mode corresponding to a second cache processing rate and a second fetch rate;

storing the write data in a write cache region of a buffer memory device of the storage device;

performing write cache processing with respect to the write cache region, based on the operating mode of the storage device from among the plurality of operating modes, the performing write cache processing comprising storing, in a nonvolatile memory device of the storage device, the write data of the write cache region;

detecting a write cache level of the write cache region;

controlling the operating mode, based on the write cache level;

measuring, in a first time period, a 0-th time during which the operating mode of the storage device is the normal mode, a first time during which the operating mode of the storage device is the first urgent mode, and a second time during which the operating mode of the storage device is the second urgent mode; and controlling the first fetch rate and the second fetch rate based on the 0-th time, the first time, and the second time.

2. The operating method of claim 1, wherein the controlling of the operating mode comprises:

based on the write cache level reaching a first reference level, operating the storage device in the first urgent mode; and based on the write cache level reaching a second reference level higher than the first reference level while operating in the first urgent mode, operating in the second urgent mode, and wherein the performing of the write cache processing comprises:

performing, in the normal mode, the write cache processing based on the 0-th cache processing rate;

performing, in the first urgent mode, the write cache processing based on the first cache processing rate higher than the 0-th cache processing rate; and performing, in the second urgent mode, the write cache processing based on the second cache processing rate higher than the first cache processing rate.

3. The operating method of claim 2, wherein the fetching of the write command and the write data comprises:

fetching, in the normal mode, the write command and the write data from the external host device, based on the 0-th fetch rate;

fetching, in the first urgent mode, the write command and the write data from the external host device, based on the first fetch rate slower than the 0-th fetch rate; and fetching, in the second urgent mode, the write command and the write data from the external host device, based on the second fetch rate slower than the first fetch rate.

4. The operating method of claim 3, further comprising:

based on the write cache level reaching a 0-th reference level lower than the first reference level in at least one of the first urgent mode or the second urgent mode, operating in the normal mode.

5. The operating method of claim 2, further comprising:

performing internal traffic processing based on data stored in an internal traffic region of the buffer memory device.

6. The operating method of claim 5, wherein the performing of the internal traffic processing comprises performing the internal traffic processing by using an internal token, and wherein the performing of the write cache processing comprises performing the write cache processing by using a write token.

7. The operating method of claim 6, wherein the performing of the write cache processing comprises performing, in the first urgent mode or the second urgent mode, the write cache processing by using the write token and an urgent token.

8. The operating method of claim 7, further comprising:

based on the write cache level reaching a 0-th reference level lower than the first reference level in the first urgent mode or the second urgent mode, operating in a refill mode, wherein the operating in the refill mode comprises:

refilling the urgent token is refilled, and operating the storage device in the normal mode, based on the urgent token being refilled.

9. The operating method of claim 1, wherein the controlling of the first fetch rate and the second fetch rate comprises:

based on the first time being longer than the 0-th time and the second time, decreasing the first fetch rate; and based on the second time being longer than the 0-th time and the first time, decreasing the second fetch rate.

10. A storage device, comprising:

a nonvolatile memory device;

a buffer memory device comprising a write cache region and an internal traffic region;

a storage controller configured to control the nonvolatile memory device and the buffer memory device; and a memory interface circuit configured to communicate with the nonvolatile memory device, wherein the storage controller is further configured to:

fetch, from an external host device using a host interface circuit, a write command and write data based on an operating mode of the storage device from among a plurality of operating modes comprising a normal mode corresponding to a 0-th cache processing rate and a 0-th fetch rate, a first urgent mode corresponding to a first cache processing rate and a first fetch rate, and a second urgent mode corresponding to a second cache processing rate and a second fetch rate;

perform a maintenance operation on the nonvolatile memory device;

detect a write cache level of the write cache region;

perform, through the memory interface circuit, write cache processing for the write cache region based on the operating mode of the storage device from among the plurality of operating modes;

perform, through the memory interface circuit, internal traffic processing for the internal traffic region;

control the operating mode, based on the write cache level;

measure, in a first time period, a 0-th time during which the operating mode of the storage device is the normal mode, a first time during which the operating mode of the storage device is the first urgent mode, and a second time during which the operating mode of the storage device is the second urgent mode; and control the first fetch rate and the second fetch rate based on the 0-th time, the first time, and the second time, wherein the write cache region is configured to store the write data, and wherein the internal traffic region is configured to store data to be used by the maintenance operation.

11. The storage device of claim 10, wherein the storage controller is further configured to:

based on the write cache level reaching a first reference level, control the operating mode to the first urgent mode; and based on the write cache level reaching a second reference level higher than the first reference level, control the operating mode to the second urgent mode, wherein a processing rate of the second urgent mode is higher than a processing rate of the first urgent mode.

12. The storage device of claim 11, wherein the second fetch rate is slower than the first fetch rate.

13. The storage device of claim 10, wherein the storage controller is further configured to:

perform the internal traffic processing and the write cache processing at a ratio of A:B, A and B being positive integers greater than zero, and based on a cache processing rate increasing, increase a value of B.

14. The storage device of claim 10, wherein the storage controller is further configured to:

manage an internal token, a write token, and an urgent token;

perform the internal traffic processing by using the internal token; and perform the write cache processing by using the write token.

15. The storage device of claim 14, wherein the storage controller is further configured to:

based on the write cache level reaching at least one of a first reference level or a second reference level, perform the write cache processing by using the urgent token.

16. The storage device of claim 15, wherein the storage controller is further configured to:

based on the write cache level reaching a 0-th reference level lower than the first reference level and the second reference level, control the operating mode to the normal mode, and refill the urgent token.

17. An operating method of a storage device, the operating method comprising:

detecting a write cache level of a buffer memory device of the storage device;

controlling a nonvolatile memory device of the storage device in an operating mode of the storage device from among a plurality of operating modes comprising a normal mode corresponding to a 0-th cache processing rate and a 0-th fetch rate, a first urgent mode corresponding to a first cache processing rate and a first fetch rate, and a second urgent mode corresponding to a second cache processing rate and a second fetch rate, based on the write cache level;

measuring, in a first time period, a 0-th time during which the operating mode of the storage device is the normal mode, a first time during which the operating mode of the storage device is the first urgent mode, and a second time during which the operating mode of the storage device is the second urgent mode; and controlling the first fetch rate and the second fetch rate based on the 0-th time, the first time, and the second time, wherein each of the 0-th cache processing rate, the first cache processing rate, and the second cache processing rate indicates a rate at which write data stored in the buffer memory device is flushed to the nonvolatile memory device, and wherein each of the 0-th fetch rate, the first fetch rate, and the second fetch rate indicates a rate at which a write command and write data are fetched from an external host device.

18. The operating method of claim 17, further comprising:

operating in the first urgent mode based on the write cache level reaching a first reference level;

operating in the second urgent mode based on the write cache level reaching a second reference level higher than the first reference level; and operating in the normal mode based on the write cache level reaching a 0-th reference level lower than the first reference level in at least one of the first urgent mode or the second urgent mode.

19. The operating method of claim 17, further comprising:

operating in the normal mode, based on the 0-th fetch rate and the 0-th cache processing rate;

operating in the first urgent mode, based on the first fetch rate slower than the 0-th fetch rate and the first cache processing rate faster than the 0-th cache processing rate; and operating in the second urgent mode, based on the second fetch rate slower than the first fetch rate and the second cache processing rate faster than the first cache processing rate.

* * * * *